(12) United States Patent
Basting et al.

(10) Patent No.: US 7,075,963 B2
(45) Date of Patent: Jul. 11, 2006

(54) TUNABLE LASER WITH STABILIZED GRATING

(75) Inventors: Dirk Basting, Fort Lauderdale, FL (US); Wolfgang Zschocke, Noerten-Hardenberg (DE); Thomas Schröeder, Göttingen (DE); Juergen Kleinschmidt, Weissenfels (DE); Matthias Kramer, Göttingen (DE); Uwe Stamm, Göttingen (DE)

(73) Assignee: Lambda Physik AG, Goettingen (DE)

( * ) Notice: Subject to any disclaimer, the term of this patent is extended or adjusted under 35 U.S.C. 154(b) by 1168 days.

(21) Appl. No.: 09/771,366

(22) Filed: Jan. 25, 2001

(65) Prior Publication Data

US 2002/0012374 A1    Jan. 31, 2002

Related U.S. Application Data

(60) Provisional application No. 60/190,682, filed on Mar. 20, 2000, provisional application No. 60/178,445, filed on Jan. 27, 2000.

(51) Int. Cl.
*H01S 3/22* (2006.01)

(52) U.S. Cl. ............... 372/55; 372/57; 372/60; 372/58; 372/59

(58) Field of Classification Search ............ 372/55, 372/57, 58, 60
See application file for complete search history.

(56) References Cited

U.S. PATENT DOCUMENTS

| | | | |
|---|---|---|---|
| 3,471,800 A | 10/1969 | Congleton et al. | 331/94.5 |
| 3,546,622 A | 12/1970 | Peterson et al. | 331/94.5 |
| 3,609,586 A | 9/1971 | Danielmeyer | 331/94.5 |
| 3,611,436 A | 10/1971 | Rigrod | 331/94.5 |
| 3,775,699 A | 11/1973 | Cassels | 331/94.5 |
| 3,806,829 A | 4/1974 | Duston et al. | 331/94.5 |
| 3,868,592 A | 2/1975 | Yarborough et al. | 331/94.5 |
| 4,016,504 A | 4/1977 | Klauminzer | 331/94.5 |
| 4,229,710 A | 10/1980 | Shoshan | 331/94.5 |
| 4,319,843 A | 3/1982 | Gornall | 356/346 |
| 4,393,505 A | 7/1983 | Fahlen | 372/57 |
| 4,399,540 A | 8/1983 | Bucher | 372/20 |
| 4,573,765 A | 3/1986 | Ireland | 350/286 |
| 4,611,270 A | 9/1986 | Klauminzer et al. | 364/183 |
| 4,616,908 A | 10/1986 | King | 350/576 |

(Continued)

FOREIGN PATENT DOCUMENTS

DE    298 22 090 U1    3/1999

(Continued)

OTHER PUBLICATIONS

S.A. Myers, "An Improved Line Narrowing Technique for a Dye Laser Excited by a Nitrogen Laser," *Optics Communications*, vol. 4, No. 2, Oct. 1971, pp. 187-189.

(Continued)

*Primary Examiner*—Minsun Oh Harvey
*Assistant Examiner*—Dung Nguyen
(74) *Attorney, Agent, or Firm*—Stallman & Pollock LLP

(57) ABSTRACT

A line-narrowing module for a laser includes a prism beam expander and a grating preferably attached to a heat sink. A pressure-controlled enclosure filled with an inert gas seals the grating and/or other elements of the line-narrowing module. The pressure in the enclosure is adjusted for tuning the wavelength. Preferably, the pressure is controlled by controlling the flow of an inert gas through the enclosure. A pump may be used, or an overpressure flow may be used. Alternatively, a prism of the beam expander or an etalon may be rotatable for tuning the wavelength.

39 Claims, 6 Drawing Sheets

U.S. PATENT DOCUMENTS

| | | | |
|---|---|---|---|
| 4,691,322 A | 9/1987 | Nozue et al. | 372/82 |
| 4,696,012 A | 9/1987 | Harshaw | 372/99 |
| 4,803,696 A | 2/1989 | Pepper et al. | 372/95 |
| 4,823,354 A | 4/1989 | Znotins et al. | 372/57 |
| 4,829,536 A | 5/1989 | Kajiyama et al. | 372/57 |
| 4,856,018 A | 8/1989 | Nozue et al. | 372/98 |
| 4,860,300 A | 8/1989 | Baumler et al. | 372/57 |
| 4,873,692 A | 10/1989 | Johnson et al. | 372/20 |
| 4,905,243 A | 2/1990 | Lokai et al. | 372/32 |
| 4,911,778 A | 3/1990 | Barnoach | 156/466 |
| 4,914,662 A | 4/1990 | Nakatani et al. | 372/32 |
| 4,926,428 A | 5/1990 | Kajiyama et al. | 372/20 |
| 4,942,583 A | 7/1990 | Nazarathy et al. | 372/20 |
| 4,972,429 A | 11/1990 | Herbst | 372/100 |
| 4,975,919 A | 12/1990 | Amada et al. | 372/33 |
| 4,977,563 A | 12/1990 | Nakatani et al. | 372/32 |
| 4,985,898 A | 1/1991 | Furuya et al. | 372/106 |
| 5,025,445 A | 6/1991 | Anderson et al. | 372/20 |
| 5,051,558 A | 9/1991 | Sukhman | 219/121.68 |
| 5,081,635 A | 1/1992 | Wakabayashi et al. | 372/57 |
| 5,095,492 A | 3/1992 | Sandstrom | 372/102 |
| 5,142,543 A | 8/1992 | Wakabayashi et al. | 372/32 |
| 5,150,370 A | 9/1992 | Furuya et al. | 372/106 |
| 5,161,238 A | 11/1992 | Mehmke | 359/738 |
| 5,198,872 A | 3/1993 | Wakabayashi et al. | 356/352 |
| 5,218,421 A | 6/1993 | Wakabayashi et al. | 356/352 |
| 5,221,823 A | 6/1993 | Usui | 219/121.78 |
| 5,226,050 A | 7/1993 | Burghardt | 372/20 |
| 5,325,378 A | 6/1994 | Zorabedian | 372/20 |
| 5,337,330 A | 8/1994 | Larson | 372/86 |
| 5,373,515 A | 12/1994 | Wakabayashi et al. | 372/20 |
| 5,396,514 A | 3/1995 | Voss | 372/57 |
| 5,404,366 A | 4/1995 | Wakabayashi et al. | 372/29 |
| 5,414,723 A | 5/1995 | Krapchev | 372/3 |
| 5,440,574 A | 8/1995 | Sobottke et al. | 372/34 |
| 5,440,578 A | 8/1995 | Sandstrom | 372/59 |
| 5,440,587 A | 8/1995 | Ishikawa et al. | 375/332 |
| 5,450,207 A | 9/1995 | Fomenkov | 356/416 |
| 5,450,436 A | 9/1995 | Mizoguchi et al. | 372/59 |
| 5,479,431 A | 12/1995 | Sobottke et al. | 372/92 |
| 5,535,233 A | 7/1996 | Mizoguchi et al. | 372/87 |
| 5,557,629 A | 9/1996 | Mizoguchi et al. | 372/87 |
| 5,559,584 A | 9/1996 | Miyaji et al. | 355/73 |
| 5,559,816 A | 9/1996 | Basting et al. | 372/27 |
| 5,590,146 A | 12/1996 | von Borstel | 372/58 |
| 5,596,456 A | 1/1997 | Luecke | 359/831 |
| 5,596,596 A | 1/1997 | Wakabayashi et al. | 372/102 |
| 5,646,954 A | 7/1997 | Das et al. | 372/55 |
| 5,657,334 A | 8/1997 | Das et al. | 372/57 |
| 5,659,419 A | 8/1997 | Lokai et al. | 359/330 |
| 5,663,973 A | 9/1997 | Stamm et al. | 372/20 |
| 5,684,822 A | 11/1997 | Partlo | 372/95 |
| 5,729,562 A | 3/1998 | Birx et al. | 372/38 |
| 5,729,565 A | 3/1998 | Meller et al. | 372/87 |
| 5,748,316 A | 5/1998 | Wakabayashi et al. | 356/352 |
| 5,748,346 A | 5/1998 | David et al. | 359/15 |
| 5,761,236 A | 6/1998 | Kleinschmidt et al. | 372/100 |
| 5,763,855 A | 6/1998 | Shioji | 219/121.84 |
| 5,764,678 A | 6/1998 | Tada | 372/57 |
| 5,771,094 A | 6/1998 | Carter et al. | 356/326 |
| 5,802,094 A | 9/1998 | Wakabayashi et al. | 372/57 |
| 5,811,753 A | 9/1998 | Weick et al. | 219/121.78 |
| 5,818,865 A | 10/1998 | Watson et al. | 372/86 |
| 5,835,520 A | 11/1998 | Das et al. | 372/57 |
| 5,852,627 A | 12/1998 | Ershov | 372/108 |
| 5,856,991 A | 1/1999 | Ershov | 372/57 |
| 5,898,725 A | 4/1999 | Fomenkov et al. | 372/102 |
| 5,901,163 A | 5/1999 | Ershov | 372/20 |
| 5,914,974 A | 6/1999 | Partlo et al. | 372/38 |
| 5,917,849 A | 6/1999 | Ershov | 372/102 |
| 5,936,988 A | 8/1999 | Partlo et al. | 372/38 |
| 5,940,421 A | 8/1999 | Partlo et al. | 372/38 |
| 5,946,337 A | 8/1999 | Govorkov et al. | 372/92 |
| 5,949,806 A | 9/1999 | Ness et al. | 372/38 |
| 5,970,082 A | 10/1999 | Ershov | 372/102 |
| 5,978,346 A | 11/1999 | Mizuno et al. | 369/112 |
| 5,978,391 A | 11/1999 | Das et al. | 372/20 |
| 5,978,394 A | 11/1999 | Newman et al. | 372/32 |
| 5,978,406 A | 11/1999 | Rokni et al. | 372/58 |
| 5,978,409 A | 11/1999 | Das et al. | 372/100 |
| 5,982,795 A | 11/1999 | Rothweil et al. | 372/38 |
| 5,982,800 A | 11/1999 | Ishihara et al. | 372/57 |
| 5,991,324 A | 11/1999 | Knowles et al. | 372/57 |
| 5,999,318 A | 12/1999 | Morton et al. | 359/572 |
| 6,005,880 A | 12/1999 | Basting et al. | 372/38 |
| 6,014,206 A | 1/2000 | Basting et al. | 356/138 |
| 6,014,398 A | 1/2000 | Hofmann et al. | 372/60 |
| 6,020,723 A | 2/2000 | Desor et al. | 320/166 |
| 6,028,872 A | 2/2000 | Partlo et al. | 372/38 |
| 6,028,879 A | 2/2000 | Ershov | 372/57 |
| 6,028,880 A | 2/2000 | Carlesi et al. | 372/58 |
| 6,061,382 A | 5/2000 | Govorkov et al. | 372/101 |
| 6,078,599 A | 6/2000 | Everage et al. | 372/20 |
| 6,094,448 A | 7/2000 | Fomenkov et al. | 372/102 |
| 6,137,821 A | 10/2000 | Ershov | 372/20 |
| 6,154,470 A | 11/2000 | Basting et al. | 372/57 |
| 6,192,064 B1 | 2/2001 | Algots | 372/99 |
| 6,219,368 B1 | 4/2001 | Govorkov | 372/59 |
| 6,240,110 B1 | 5/2001 | Ershov | 372/20 |
| 6,288,832 B1 | 9/2001 | Richman et al. | 359/330 |
| 6,327,290 B1 | 12/2001 | Govorkov et al. | 372/61 |
| 6,345,065 B1 | 2/2002 | Kleinschmidt et al. | 372/57 |
| 6,381,257 B1* | 4/2002 | Ershov et al. | 372/57 |
| 6,421,365 B1* | 7/2002 | Kleinschmidt et al. | 372/108 |
| 6,490,306 B1* | 12/2002 | Stamm et al. | 372/57 |
| 6,516,012 B1* | 2/2003 | Kleinschmidt et al. | 372/29.01 |
| 6,553,050 B1* | 4/2003 | Kleinschmidt et al. | 372/57 |
| 6,567,451 B1* | 5/2003 | Kleinschmidt et al. | 372/57 |
| 6,603,789 B1* | 8/2003 | Kleinschmidt | 372/57 |
| 2002/0057723 A1* | 5/2002 | Kleinschmidt | 372/57 |
| 2002/0141471 A1* | 10/2002 | Aab et al. | 372/57 |
| 2003/0016708 A1* | 1/2003 | Albrecht et al. | 372/25 |

FOREIGN PATENT DOCUMENTS

| | | |
|---|---|---|
| EP | 0 472 727 A1 | 3/1992 |
| EP | 0 395 717 B1 | 9/1993 |
| EP | 0 778 642 A2 | 12/1996 |
| EP | 0 790 681 A2 | 8/1997 |
| EP | 0 402 570 B1 | 1/1998 |
| EP | 0 955 706 A1 | 1/1999 |
| EP | 1 063 503 A1 | 6/2000 |
| EP | 1 017 086 A1 | 7/2000 |
| EP | 1 041 689 A1 | 10/2000 |
| EP | 1 102 368 A2 | 5/2001 |
| EP | 1 119 083 A2 | 7/2001 |
| JP | 44-8147 | 3/1969 |
| JP | 60-205420 | 10/1985 |
| JP | 61-139950 | 6/1986 |
| JP | 8-274399 | 11/1986 |
| JP | 62-160783 | 7/1987 |
| JP | 63-45875 | 2/1988 |
| JP | 1-179477 | 7/1989 |
| JP | 2-152288 | 6/1990 |
| JP | 3-82183 | 4/1991 |
| JP | 3-139893 | 6/1991 |
| JP | 5-291674 | 11/1993 |
| JP | 408055792 A | 2/1996 |
| JP | 2631554 | 7/1997 |
| JP | 2696285 | 1/1998 |
| JP | 10-209533 | 8/1998 |
| WO | WO 96/16455 | 5/1996 |
| WO | WO 98/57213 | 12/1998 |
| WO | WO 98/59364 | 12/1998 |

| WO | WO 99/04467 | 1/1999 |
| WO | WO 99/08133 | 2/1999 |
| WO | WO 99/19952 | 4/1999 |

OTHER PUBLICATIONS

T.W. Hansch, "Repetitively Pulsed Tunable Dye Laser for High Resolutioon Spectroscopy," *Applied Optics*, Apr. 1972, vol. 11, No. 4, pp. 895-898.

Chang, T.Y., "Improved Uniform-Field Electrode Profiles for TEA Laser and High-Voltage Applications," *The Review of Scientific Instruments*, Apr. 1973, vol. 44, No. 4, pp. 405-407.

A. Boom, "Modes of a Laser Resonator Containing Tilted Birefringent Plates," *J. of the Optical Society of America*, vol. 64, No. 4, Lancaster Press, Inc., Lancaster, PA, Apr. 1974, pp. 447-452.

M. Okada, et al., "Electronic Tuning of Dye Lasers by an Electrooptic Birefringent Fabry-Perot Etalon," *Optics Communications*, vol. 14, No. 1, North-Holland Publishing Co., Amsterdam, May 1975, pp. 4-7.

R.B. Green, et al., "Galvanic Detection of Optical Absorptions in a Gas Discharge," *Applied Physics Letters*, Dec. 1, 1976, vol. 29, No. 11, pp. 727-729.

James K. Rice, A. Kay Hays, and Joseph R. Woodwsorth, "VUV Emissions from Mixtures of $F_2$ and the Noble Gasses—A Molecular $F_2$ Laser at 1575 Å[a])," *Applied Physics Letters*, vol. 31, No. 1, Jul. 1, 1977, pp. 31-33.

J. R. Woodworth, et al., "An Efficient, High-Power F2 Laser Near 157nm," *J. of Chem. Physics*, vol. 69, No. 6, American Institute pf Physics, Sep. 15, 1978, pp. 2500-2504.

S. Saikan, "Nitrogen-Laser-Pmped Single-Mode Dye Laser," *Applied Physics*, 1978, pp. 41-44.

H. Pummer, K. Hohla, M. Diegelmann and J.P. Reilly, "Discharge pumped $F_2$ Laser at 1580 Å," *Optics Communications*, vol. 28, No. 1, Jan. 1979, pp. 104-106.

Shin Sumida, Minoru Obara, and Tomoo Fujioka, "Novel neutral atomic fluorine laser lines in a high-pressure mixture of $F_2$ and He," *Journal of Applied Physics*, vol. 50, Jun. 1979, No. 6, pp. 3384-3387.

R.A. Keller, et al., "Opto-galvanic Spectroscopy in a Uranium Hollow Cathode Discharge," *J. Opt. Soc. Am.*, May 1979, vol. 69, No. 5, pp. 738-742.

K. Hohla, M. Diegelmann, H. Pummer, K.L. Kompa, "CIF and $F_2$: two new ultra-violet laser systems," *Optics and Laser Technology*, vol. 11, No. 6, Dec. 1979, pp. 305-310.

M.H.R. Hutchinson "Vacuum ultraviolet excimer lasers,", *Applied Optics VUV VI*, vol. 19, No. 23, Dec. 1, 1980, pp. 3883-3888.

Richard A. Keller, et al., "Atlas for Optogalvanic Wavelength Calibration," *Applied Optics*, Mar. 15, 1980, vol. 19, No. 6, pp. 836-837.

James K. Rice, et al., "Oscillator Performance and Energy Extraction from a KrF Laser Pumped by a High-Intensity Relativistic Electron Beam," *IEEEE Journal of Quantum Electronics*, vol. QE-16, No. 12, Dec. 1980, pp. 1315-1326.

Wolfgang Demtröder, *Laser Spectroscopy: Basic Concepts and Instrumentation*, Mar. 1981, pp. 128, 277.

R. Sadighi-Bonabi, F.W. Lee, and C.B. Collins, "Gain and saturation of the atomic fluorine laser," *Journal of Applied Physics*, vol. 53, May 1982, No. 5, pp. 3418-3423.

H. Lengfellner, "Generation of Tunable Pulsed Microwave Radiation by Nonlinear Interaction of Nd:YAG Laser Radiation in GaP Crystals," *Optics Letters*, vol. 12, No. 3, Mar. 1982, pp. 184-186.

S. Marcus, "Cavity Dumping and Coupling Modulation of an Electron-Coupled CO2 Laser," *J. Appl. Phys.* vol. 53, No. 9, Sep. 1982, pp. 6029-6031.

Norman J. Dovichi, et al., "Use of the Optogalvanic Effect and the Uranium Atlas for Wavelength Calibration of Pulsed Lasers," *Applied Optics*, Apr. 15, 1982, vol. 21, No. 8, pp. 1468-1473.

Ernst, G.J., "Compact Uniform Field Electrode Profiles," *Optics Communications*, Aug. 1, 1983, vol. 47, No. 1, pp. 47-51.

P. Camus, "Atomic Spectroscopy with Optogalvanic Detection," *Journal De Physique*, (Paris) Nov. 1983, 11C7, pp. C7-87-106.

Irving J. Bigio, et al., "injection-Locking Unstable Resonator Excimer Lasers," *IEEE J. of Quantum Electronics*, vol. QE-19, No. 9, Sep. 1983, pp. 1426-1436.

Ernst, G.J., "Uniform-Field Electrodes with Minimum Width," *Optics Communications*, Mar. 15, 1984, vol. 49, No. 4, pp. 275-277.

Marilyn J. Dodge, "Refractive Properties of magnesium Fluoride," *Applied Optics*, vol. 23, No. 12, Jun. 15, 1984, pp. 1980-1985.

I.G. Koprinkov, K.V. Stamenov, and K.A. Stankov, "Intense Laser Generation from an Atomic-Fluorine," *Applied Physics*, vol. B33, No. 4, Apr. 1984, pp. 235-238.

A.C. Cefalas, C. Skordoulis, M. Kompitasas and C.A. Nicolaides, "Gain Measurements at 157 nm in an $F_2$ Pulsed Discharge Molecular Laser," *Optics Communications*, vol. 55, No. 6, Oct. 15, 1985, pp. 423-426.

T. J. McKee, "Spectral-narrowing Techniques for Excimer Laser Oscillators," *Canadian J. of Physics*, vol. 63, No. 2, Feb. 1985, pp. 214-219.

E. Armandillo, et al., "Simple, Compact, High-Repetition Rate XeCI Laser," *Review of Scientific Instruments*, vol. 56, No. 5, Part 1, May 1985, pp. 674-676.

V. N. Ischenko, et al., "High-power Efficient Vacuum Ultraviolet F2 Laser Excited by an Electric Discharge," *Soviet J. of Quantum Electronics*, vol. 16, No. 5, American Institute of Physics, May 1986, pp. 707-709.

F. Babin, et al., "Ultraviolet Optogalvanic Laser Spectroscopy of Iron for Reference Wavelenghts," *Optics Letters*, Jul. 1987, vol. 12, No. 7, pp. 468-470.

W. Muckenheim, et al., "Seven Ways to Combine Two Excimer Lasers," reprinted from Jul. 1987 edition of *Laser Focus/Electro-Optics*.

W. Muckenheim, et al., "Excimer Laser with Narrow Linewidth and Large Internal Beam Divergence," *J. Phys. E. Sci. Instrum.*, 20, 1987, 1934-1935.

Mieko Ohwa and Minoru Obara, "Theoretical evaluation of high-efficiency operation of discharge-pumped vacuum-ultraviolet $F_2$ lasers," *Applied Physics Letters*, vol. 51, No. 13, Sep. 28, 1987, pp. 958-960.

ZOS, Akademie der Wissenschaften der DDR, Zentralinstitut fur Optik und Wissenschaften der DDR, Oktober 1987, "Leistungastarker atomarer Fluorlaser im roten Spektralbereich," Jurgen Lademann, Roland Kunig, Wadim Saidow, Rainer Weidauer, pp. 1-17.

T. Uematsu et al. Keio U., "Theoretical simulation of a discharge pumped $F_2$ excimer laser," *Discharge-Pumped Excimer Laser Research in Japan*, Apr. 1988, pp. 3-4.

Ohwa, M., et al., "High-power discharge pumped F2 laser," *Discharge-Pumped Excimer Laser Research in Japan*, Apr. 1988, pp 45.

Koich Wani, Yoshiro Ogata, Yoshiaki Watarai, Takuhiro Ono, Takeo Miyata, Reiji Sano, and Yasuaki Terui, "Narrow-band KrF excimer laser—tunable and wavelength stabilized," *SPIE—The International Society for Optical Engineering, Excimer Beam Applications*, vol. 998, Sep. 6, 1988, Boston, Massachusetts, pp. 2-8.

R.K. Brimacombe, T.J. McKee, E.D. Mortimer, B. Norris, J. Reid, T.A. Znotins, "Line-narrowed industrial excimer laser for microlithography," *Conference on Lasers and Electro-Optics*, 1989 Technical Digest Series, vol. 11, Apr. 24-29, 1989, Baltimore, Maryland.

Kawakatsu Yamada, Kenzo Miyazaki, Toshifumi Hasama, and Takuzo Sata, "High-power discharge-pumped $F_2$ molecular laser," *Applied Physics Letters*, vol. 54, Feb. 13, 1989, No. 7, pp. 391-394.

K. Yamada, K. Miyazaki, T. Hasama, T. Sato, M. Kasamatsu, and Y. Mitsuhashi, "High Power Discharge-Pumped $F_2$ Laser," *Leos '89, Lasers and Electro-Optics Society Annual Meeting Conference Proceedings*, Oct. 17-20, 1989, Orlando, Florida, pp. 597-599.

Wataru Sasaki, Kou Kurosawa, "Intense VUV-XUV generation from rare gas excimers," *Conference on Lasers and Electro-Optics*, 1989 Technical Digest Series, vol. 11, May 24-28, 1989, Baltimore, Maryland, 23 pgs.

*Verhandlungen*, Mar. 1990, Phsyikertagung Munchen, 1990, Optimierung der VUV-Emission bei 157 nm ($F_2$-Linie) bei entladungs—gepemten Excimerlasern, F. Voss, 2 pgs.

M. Kakehata, et al., "Experimental Study of Tunability of a Discharge Pumped Molecular Fluorine Laser," *Conference on Lasers and Electro-optics*, vol. 7, Optical Society of America, May 1990, pp. 106-108.

Masayuki Kakehata, Etsu Hashimoto, Fumihiko Kannari, and Minoru Obara, "Frequency up-conversion of a discharge pumped molecular fluorine laser by stimulated Raman scattering in $H_2$," *Gas Flow and Chemical Lasers*, SPIE vol. 1397, Sep. 10-14, 1990, pp. 185-189.

K. Komatsu, E. Matsui, S. Takahashi, Fumiko Kannari, M. Obara, "Spectroscopic comparison between low and high pressure discharge pumped Xe atomic lasers," *Conference on Lasers and Electro-optics, 1990 Technical Digest Series*, vol. 7, May 21-25, 1990, Anaheim, California, pp. 106.

Masayuki Kakehata, Etsu Hashimoto, Fumihiko Kannari and Minoru Obara, "High specific output energy operation of a vacuum ultraviolet molecular fluorine laser excited at 66 MW/cm$^3$ by an electric discharge," *Applied Physics Letters*, vol. 56, Jun. 25, 1990, No. 26, pp. 2599-2601.

C. Skordoulis, E. Sarantopoulou, S. Spyrou and A.C. Cefalas, "Amplification characteristics of a discharge excited $F_2$ laser," *Journal of Modern Optics*, vol. 37, No. 4, Apr. 1990, pp. 501-509.

R.L. Sandstrom, "Measurements of Beam Characteristics Relevant to DUV Microlithography of KrF Excimer Laser," *SPIE Optical/Laser Microlithography III*, vol. 1264, 1990, pp. 505-519.

*Science Report, LAMBDAPHYSIK*, No. 3, Nov. 1990, "Breakthrough in $F_2$Laser Technology," 4 pgs.

*Highlights Lambdaphysik*, No. 29, Jun. 1991, "VUV Spectroscopy by Frequency Tripling," 6 pgs.

R. Sandstrom, "Argon Fluoride Excimer Laser Source for Sub-0.25 mm Optical Lithography," *Optical/Laser Microlithography IV*, 1991, vol. 1463, pp. 610-616.

C. Momma, A. Tunnermann, F. Voss, C. Windolph and B. Wellegehausen, "Stimulated Raman scattering of a $F_2$-Laser in $H_2$" *Institut Fur Quantenoptik*, Oct. 22,1991, 8 pgs.

*Tagungsband*, Vom. 24, Bis. 26, Sep. 1991, Abstract: "Vakuum UV Molekullaser mit hoher Ausgangsleistung," Voss, F., et al.

Masayuki Kakehata, Tatsuya Uematsu, Fumihiko Kannari, and Minoru Obara, "Efficiency Characterization of Vacuum Ultraviolet Molecular Fluorine ($F_2$) Laser (157 nm) Excited by an Intense Electric Discharge," *IEEE Journal of Quantum Electronics*, Nov. 1991, vol. 27, No. 11, pp. 2456-2464.

D. Basting, "Industrial Excimer Lasers," 1991, pp. 40-41.

D.R. Hall et al., "The Physics and Technology of Laser Resonators," 1992, pp. 244-245.

Z. Haixing, et al., "Some Problems in 1:1 Broadband Excimer Laser Lithography," *Proceedings SPIE Optical/Laser Microlithography V*, Mar. 11-13, 1992, vol. 1674, pp. 701-705.

M. Mizoguchi, et al., "100-fs, 10-Hz, terawatt KrF Laser," *J. of Opt. Soc. Am. B*, vol. 9, No. 4, Apr. 1992, pp. 560-564.

*Highlights, Lambdaphysik*, No. 33, Feb. 1992, "VUV Stokes and Anti-Stokes Raman Lines Derived from an $F_2$ Laser," C. Momman, A. Tunermann, F. Voβ, C. Windolph, and B. Wellegehausen, 5 pgs.

J.H.C. Sedlacek, et al., "Optical Materials for Use with Excimer Lasers," *SPIE*, vol. 1835, Excimer Lasers, 1992, pp. 80-88.

D. J. Krajnovich, et al., "Testing of the Durability of Single-Crystal Calcium Fluoride with and without Antireflection Coatings for Use with High-power KrF Excimer Lasers," *Applied Optics*, vol. 31, No. 28, Oct. 1, 1992, pp. 6062-6075.

Shintaro Kawata, et al., "Spatial Coherence of KrF Excimer Lasers," *Applied Optics*, vol. 31, No. 3, Jan. 20, 1992, pp. 387-395.

S.M. Hooker et al., "Influence of Cavity Configuration on the Pulse Energy of a High-Pressure Molecular Fluorine Laser," *Applied Physics B Photo-Physics and Laser Chemistry*, vol. B55, No. 1., Jul. 1992, pp. 55-59.

H.M.J. Bastiaens, B.MN.C. van Dam, P.J.M. Peters, and W. J. Witteman, "Small-signal gain measurements in an electron beam pumped $F_2$ laser," *Applied Physics Letters*, vol. 63, No. 4, Jul. 26, 1993, pp. 438-440.

*Highlights Lambdaphysik*, Apr. 1993, "Excimer laser based microstructuring using mask projection techniques," U. Sarbach and H.J. Kahlert, pp. 2-4.

Nagai, et al., "Development of High Power Narrow Spectrum-Tunable Excimer Laser,"*Mitsubishi Heavy Industries Report*, vol. 30, No. 5, Sep. 1993, pp. 443-446 (Japanese Article and Translation included).

*Highlights, Lambdaphysik*, No. 43, Jan. 1994, "Photochemical modification of Fluorocarbon Resin to Generate Adhesive Properties," 6 pgs.

*High Power Laser & Particle Beams*, vol. 6, No. 4, Series No. 24, Nov. 15, 1994.

Abstract and Handouts of an Aug. 15-18, 1995 conference in Colorado Springs, Colorado, from the First International Symposium on 193nm Lithography. "ArF Excimer Laser with Repetition Rate for DUV Lithography," by R. Patzel, et al., 21 pages.

F.T.J.L. Lankhorst, H.M.J. Bastiaens, H. Botma, P.J.M. Peters, and W.J. Witteman "Long pulse electron beam pumped molecular $F_2$Laser," *Journal of Applied Physics*, vol. 77, Jan. 1-15, 1995, pp. 399-401.

Y.G. Basov, "Telescopic and Dispersive Prism Devices for Laser Technology," *J. Opt. Technol.*, vol. 62, No. 3, Mar. 1995, pp. 141-152.

Borisov, V.M., et al., "Effects limiting the average power of compact pulse-periodic KrF lasers," *Quantum Electronics*, vol. 25, No. 5, May 1995, pp. 421-424.

M. Rothschild, et al., "Optical Materials for 193 nm Lithography," *First Intl. Symp. On 193 nm Lithography*, Digest of Abstracts, Aug. 15-18, 1995.

M. Rothschild, et al., "193-nm Lithography," *Proceedings of SPIE*, Lasers as Tools for Manufacturing of Durable Goods and Microelectronics, Jan. 29-Feb. 2, 1996, San Jose, CA, vol. 2703, pp. 398-404.

H.J. Eichler, et al., "Effective Etalon Reflectors with High Damage Threshold for Erbium Laser Development," *CLEO '96—Conference on Lasers and Electro-Optics*, pp. 147-148.

G. Grunefeld, et al., "Operation of KrF and ArF Tunable Excimer Lasers without Cassegrain Optics," *Applied Physics B*, vol. 62, 1996, pp. 241-247.

U. Stamm, et al., "ArF Excimer Laser for 193 nm Lithography," paper presented at SPIE's 22nd Annual Int. Symp. On Microlithography, *SPIE*, vol. 3051-42, Mar. 9-14, 1997, Santa Clara, CA, USA., pp. 868-873.

Press Release entitled: "Lambda Physik shows readiness for the future challenges of microlithography," Fort Lauderdale, FL. 1997.

Tahei Kitamura, Yoshihiko Arita and Keisuke Maeda, Masayuki Takasaki, Kenshi Nakamura, Yoshiano Fujiwara and Shiro Horiguchi, "Small-signal gain measurements in a discharge-pumped $F_2$ laser, " *Journal of Applied Physics*, vol. 81, No. 6, Mar. 1997, pp. 2523-2528.

J. H. C. Sedlaek, et al., "Performance of Excimer Lasers as Light Sources for 193-nm Lithography," *Proceedings of SPIE, Optical Microlithography X*, Mar. 12-14, 1997, Santa Clara, CA, vol. 3051, pp. 874-881.

H. Schomalenstroth et al., "Untersuchungen zum Laserstrahlschweissen mit 1-wk-nd:YAG-Laser unter Einsatz verschiedener Schutzgasgemische," *Schweissen& Schneiden*, 49 (1997) Heft 7, pp. 420-424.

K. Wani, et al., "Narrow-band KrF Excimer Laser—Tunable and Wavelength Stabilized," *SPIE—The International Society for Optical Engineering*, Excimer Beam Applications, vol. 998, Sep. 6, 1998, Boston, MA, 10 pages.

Technology World Briefs, "Laser Could Extend Optical Lithography into DUV," *Photonics Spectra*, Jan. 1998.

T. Hofmann, et al., "Revisiting the F2 Laser for DUV Microlithography," *Proceedings of SPIE: Optical Microlithography XII*, vol. 3679, Mar. 14-19, 1999, Santa Clara, CA, USA, pp. 541-546.

Uwe Stamm, et al., "Excimer Laser for 157 nm Lithography," *24th International Symposium on Microlithography*, Mar. 14-19, 1999, Santa Clara, CA, USA, pp. 816-826.

T. Hofmann, et al., "Prospects of High Repetition Rate F2 (157 nm) Laser for Microlithography," *International SEMATECH Workshop*, Feb. 15-17, 1999, Litchfield, AZ, USA, pp. 237-246.

Uwe Stamm, et al., "Status of 157 nm Excimer Laser," *International SEMATECH Workshop*, Feb. 15-17, 1999, Litchfield, AZ, USA.

D. Basting, et al., "Processing of PTFE with High Power VUV Laser Radiation," 2 pages.

J.A.R. Samson, "Techniques of Vacuum Ultraviolet Spectroscopy," John Wiley & Sons, New York.

* cited by examiner

TUNABLE LASER WITH STABILIZED GRATING

PRIORITY

This application claims the benefit of priority to U.S. provisional patent applications No. 60/178,445, filed Jan. 27, 2000 and 60/190,682, filed Mar. 20, 2000.

BACKGROUND OF THE INVENTION

1. Field of the Invention

The invention relates to a line-narrowed laser, and particularly to a tunable excimer or molecular fluorine laser having a thermally and mechanically stabilized grating.

2. Discussion of the Related Art

Semiconductor manufacturers are currently using deep ultraviolet (DUV) lithography tools based on KrF-excimer laser systems operating around 248 nm, as well as the following generation of ArF-excimer laser systems operating around 193 nm. The ArF and KrF lasers have a broad characteristic bandwidth of 300 to 400 pm or more (FWHM). Vacuum UV (VUV) uses the $F_2$-laser which characteristically emits two or three closely spaced lines around 157 nm.

It is important for their respective applications to the field of sub-quarter micron silicon processing that each of the above laser systems become capable of emitting a narrow spectral band of known bandwidth and around a very precisely determined and finely adjustable absolute wavelength. Techniques for reducing bandwidths by special resonator designs to less than 100 pm (for ArF and KrF lasers) for use with all-reflective optical imaging systems, and for catadioptric imaging systems to less than 0.6 pm, and preferably less than 0.5 pm, are being continuously improved upon.

For the application of excimer lasers as light sources for steppers and/or scanners for photographic microlithography, it is desired to have laser emission within a range that is far smaller than the natural linewidth, e.g., around 300 to 400 pm for ArF and KrF lasers. The extent of the desired line narrowing depends on the imaging optics of the stepper/scanner devices. The desired bandwidth for catoptric systems is less than around 50 pm, and for catadioptric or dioptric optics it is less than around 0.6 pm. Currently, used systems for the KrF laser emitting around 248 nm have a bandwidth around 0.6 pm. To improve the resolution of the projection optics, a narrower laser bandwidth is desired for excimer laser systems of high reliability and very small bandwidth of 0.4–0.5 pm or less.

A line-narrowed excimer or molecular fluorine laser used for microlithography provides an output beam with specified narrow spectral linewidth. It is desired that parameters of this output beam such as wavelength, linewidth, and energy and energy dose stabilty be reliable and consistent. Narrowing of the linewidth is generally achieved through the use of a linewidth narrowing and/or wavelength selection and wavelength tuning module (hereinafter "line-narrowing module") most commonly including prisms, diffraction gratings and, in some cases, optical etalons.

U.S. patent application Ser. No. 09/317,527, which is assigned to the same assignee as the present application and is hereby incorporated by reference, describes the use of a pressure-tuned etalon (see also U.S. Pat. Nos. 5,901,163 and 4,977,563, also hereby incorporated by reference). The etalon is enclosed within a housing and an inert gas is filled particularly between the plates forming the etalon gap. The interferometric properties of the etalon are controlled by adjusting the pressure of the gas, and thus the index of refraction of the gas in the gap.

Line-narrowing modules typically function to disperse incoming light angularly such that light rays of a beam with different wavelengths are reflected at different angles. Only those rays fitting into a certain "acceptance" angle of the resonator undergo further amplification, and eventually contribute to the output of the laser system.

For broadband excimer lasers such as the ArF and KrF lasers mentioned above, the central wavelengths of line-narrowed output beams may be tuned within their respective characteristic spectra. Tuning is typically achieved by rotating the grating or highly reflective (HR) mirror associated with the line-narrowing module. The grating is, however, a fairly bulky optical component resulting in difficulties for precision tuning.

Excimer and molecular fluorine lasers particularly manufactured for photolithography applications are being developed to emit pulsed radiation at higher repetition rates such as 1–2 kHz and above. At these higher repetition rates, improvements are sought for reducing thermal stresses on the resonator optics.

SUMMARY OF THE INVENTION

It is an object of the invention to provide a line-narrowing module for a precision-tunable excimer or molecular fluorine laser.

It is a further object of the invention to provide a line-narrowing module for a high repetition rate excimer laser having a thermally stabilized diffraction grating.

It is an additional object of the invention to provide a line-narrowing module for an excimer or molecular fluorine laser having a mechanically stabilized grating.

In accord with the above objects, a line-narrowing module for use with an excimer or molecular fluorine laser system is provided including a multiple prism beam expander and a reflection grating preferably attached to a heat sink. A pressure-controlled enclosure filled with an inert gas seals the grating and/or other elements, such as an etalon and/or one or more of the beam expanding prisms, of the line-narrowing module. The pressure in the enclosure is adjusted for tuning the wavelength. Alternatively, an intracavity etalon or a prism of the beam expander is rotatable for tuning the wavelength. Advantageously, the grating may be fixed in position attached to the heat sink having enhanced thermal and mechanical stability, and the wavelength may be tuned without rotating the grating.

When pressure tuning is used, the pressure may be advantageously varied by either controlling the flow rate of a purging gas continuously flowing through a total or partial line-narrowing module enclosure or grating enclosure, or by increasing or decreasing the gas pressure in a sealed enclosure such as by pumping or overpressurizing the interior of the enclosure. A pump may be used particularly for under-pressure (i.e., less than outside pressure) flow through the enclosure. An over-pressure (i.e., more than outside pressure) flow may be used with or without the use of a pump. Preferably, the pressure is controlled, e.g., by controlling the flow rate as discussed above, by a processor in a feedback arrangement with a wavelength detector. Advantageously, the output emission wavelength is continuously adjustable and stabilized.

Also in accord with the above objects, an excimer or molecular fluorine laser is provided including a discharge chamber filled with a gas mixture including molecular fluorine, multiple electrodes within the discharge chamber connected to a pulsed discharge circuit for energizing the gas mixture, a resonator for generating a laser beam including a pair of resonator reflector surfaces, the discharge chamber and a line-narrowing module including one or more optical elements for reducing the bandwidth of the beam, a sealed enclosure around one or more optical elements of the line-narrowing module, and a processor for monitoring the wavelength of the beam. The sealed enclosure includes an inert gas inlet for filling the enclosure with an inert gas. The processor controls the pressure of the inert gas within the enclosure for tuning the wavelength output by the line-narrowing module. The enclosure may further include an outlet for flowing an inert gas through the enclosure.

An excimer or molecular fluorine laser is also provided including a discharge chamber filled with a gas mixture including molecular fluorine, multiple electrodes within the discharge chamber connected to a pulsed discharge circuit for energizing the gas mixture, and a resonator for generating a laser beam including a pair of resonator reflector surfaces. The discharge chamber and a line-narrowing module including a beam expander, an interferometric device and a grating for reducing the bandwidth of the beam. The interferometric device is disposed before the grating after the beam expander.

DETAILED DESCRIPTION OF THE PREFERRED EMBODIMENTS

Figure 1:
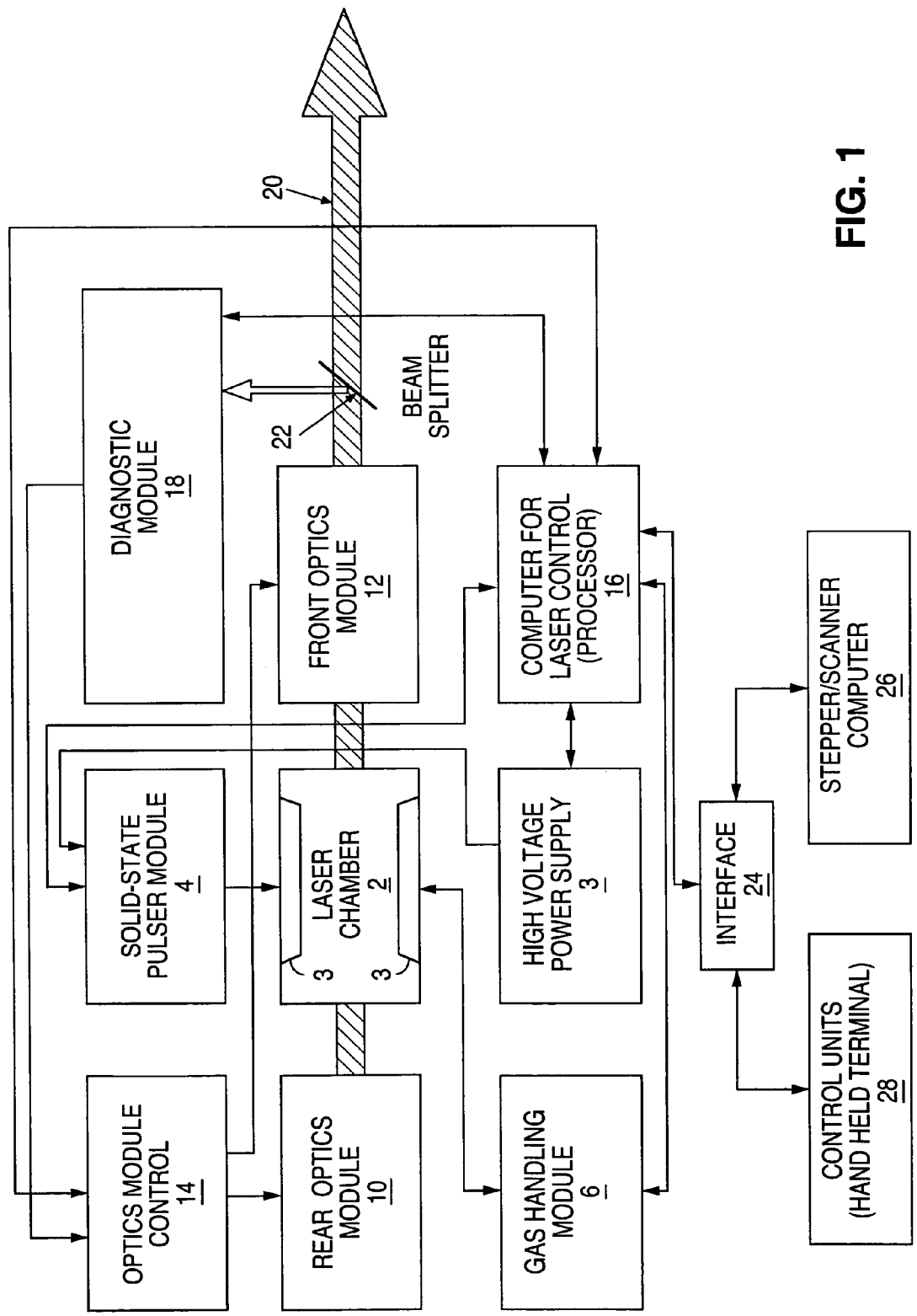
FIG. 1 schematically shows a laser system in accord with the preferred embodiment.

FIG. 1 schematically shows a laser system in accord with a preferred embodiment. The system includes a laser chamber 2 filled with a gas mixture and having a pair of main electrodes 3 and one or more preionization electrodes (not shown). The electrodes 3 are connected to a solid-state pulser module 4. A gas handling module 6 is connected to the laser chamber 2. A high voltage power supply 8 is connected to the pulser module 4. A laser resonator is shown including the laser chamber 2 and including a rear optics module 10 and a front optics module 12. One or both of the optics modules 10 and/or 12, and preferably the rear optics module 10, includes a line-narrowing module in accord with various embodiments set forth in more detail below. An optics control module 14 communicates with the rear and front optics modules 10, 12. Alternatively, the processor 16 may communicate directly with the optics modules 10, 12. The computer or processor 16 controls various aspects of the laser system. A diagnostic module 18 receives a portion of the output beam 20 from a beam splitter 22.

The gas mixture in the laser chamber 2 preferably includes about 0.1% $F_2$, 1.0% Kr and 98.9% Ne for a KrF-laser, 0.1% $F_2$, 1.0% Ar and 98.9% Ne and/or He for an ArF laser, and 0.1% $F_2$ and 99.9% Ne and/or He for a $F_2$ laser (for more details on the preferred gas mixtures, see U.S. patent application Ser. Nos. 09/513,025, 09/447,882, 60/124,785, 09/418,052, 60/171,717, 60/159,525, 09/379,034, 09/484,818, 60/127,062 and 60/160,126, and U.S. Pat. Nos. 6,157,662, 4,393,505, 6,160,832 and 4,977,573, each of which is assigned to the same assignee as the present application and is hereby incorporated by reference). The laser system may be another laser system including a line-narrowing module such as a dye laser. A trace amount of a gas additive such as xenon, argon or krypton may be included (see the '025 application, mentioned above).

The gas mixture is preferably monitored and controlled using an expert system (see the '034 application, mentioned above). One or more beam parameters indicative of the fluorine concentration in the gas mixture, which is subject to depletion, may be monitored, and the gas supply replenished accordingly (see the '882, '052, '525, '034, and '062 applications, mentioned above). The diagnostic module 18 may include appropriate monitoring equipment or a detector may be positioned to receive a beam portion split off from within the laser resonator (see the '052 application). The processor 16 preferably receives information from the diagnostic module 18 which is indicative of the halogen concentration and initiates gas replenishment actions such as micro-halogen injections, mini and partial gas replacements, and pressure adjustments by communicating with the gas handling module 6 (see the '882 and '717 applications).

Although not shown, the gas handling module 6 has a series of valves connected to gas containers external to the laser system. The gas handling module 6 may also include an internal gas supply such as a halogen and/or xenon supply or generator (see the '025 application). A gas compartment (not shown) may be included in the gas handling module 6 for precise control of the micro halogen injections (see the '882 and '717 applications, mentioned above, and U.S. Pat. No. 5,396,514, which is assigned to the same assignee as the present application and is hereby incorporated by reference).

The wavelength and bandwidth of the output beam 20 are also preferably monitored and controlled. Preferred wavelength calibration devices and procedures are described at the '832 patent, mentioned above, U.S. patent application Ser. No. 09/271,020, and U.S. Pat. No. 4,905,243, each of which is assigned to the same assignee as the present application and is hereby incorporated by reference. The monitoring equipment may be included in the diagnostic module 18 or the system may be configured to outcouple a beam portion elsewhere such as from the rear optics module 10, since only a small intensity beam portion is typically used for wavelength calibration (see the '832 patent).

Preferred main electrodes 3 are described at U.S. patent application Ser. Nos. 60/128,227, 09/453,670 and 60/184,705, which are assigned to the same assignee as the present application and are hereby incorporated by reference. Other electrode configurations are set forth at U.S. Pat. Nos. 5,729,565 and 4,860,300, each of which is assigned to the same assignee and is hereby incorporated by reference. Preferred preionization units are set forth at U.S. patent application Nos. 60/162,845, 60/160,182, 09/692,265, 60/127,237, 60/138,409 and 09/247,887, each of which is assigned to the same assignee as the present application and is hereby incorporated by reference. The preferred solid state pulser module 4 and the high voltage power supply 8 are set forth at U.S. Pat. Nos. 6,020,723 and 6,005,880, and U.S. patent application Nos. 60/149,392, 09/640,595, 60/204,095 and 09/390,146, each of which is assigned to the same assignee as the present application and is hereby incorporated by reference into the present application.

The processor 16 is also shown connected to an interface 24. The interface 24 allows the processor 16 to communicate, e.g., with a stepper/scanner computer 26 associated with an imaging system for photolithography. The interface 24 also allows the processor 16 to communicate with control units 28 at a hand held terminal, also associated with the imaging system or otherwise at the fab.

As shown in FIG. 1, the processor 16 communicates with various modules of the laser system through various interfaces. In addition, some of the modules may communicate directly with each other, e.g., some of the modules may be configured with their own microprocessors. The processor 16 is communicating through the six interfaces shown for the purposes of illustration and may communicate through more or fewer interfaces and with a variety of other modules through the same or additional interfaces depending on the configurational specifications of the laser system.

A laser beam path from the output coupler to an imaging system or application may be enclosed within an enclosure such as is described at U.S. patent application Ser. Nos. 09/343,333, 09/594,892 and 09/131,580, each of which is assigned to the same assignee and is hereby incorporated by reference. Similar enclosures may seal the path between the chamber and optics modules 10, 12 within the laser resonator. Such enclosures are particularly preferred for the $F_2$ laser, and also for the ArF laser.

Figure 2:
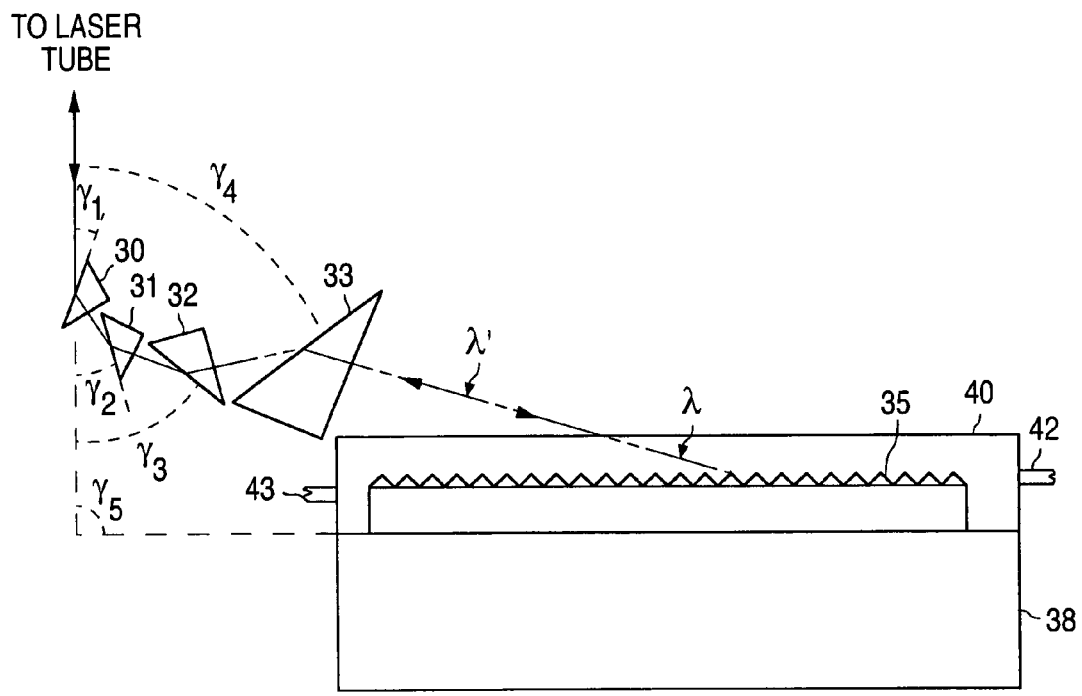
FIG. 2 schematically shows a line-narrowing module in accord with a first embodiment.

FIG. 2 schematically shows a line-narrowing module in accord with a first embodiment. The line narrowing module shown includes a beam expander comprising four beam expanding prisms 30, 31, 32 and 33, and a grating 35, which is preferred for the ArF laser, while more or fewer than four prisms may be used. The line-narrowing module may include other optics such as one or more etalons, a dispersive prism and/or a transmission grating or transmission or reflection grism. A transmission grism or transmission grating together with a highly reflective mirror may be substituted for the grating. A reflection grism may also be substituted for the grating 35 (see the '532 application, mentioned above and U.S. patent application No. 60/173,933, which is assigned to the same assignee and is hereby incorporated by reference). Depending on the laser application and imaging system for which the laser is to be used, alternative line-selection and/or line-narrowing techniques which may be used within the scope of the invention are described at some or all of U.S. Pat. Nos. 4,399,540, 4,905,243, 5,226,050, 5,559,816, 5,659,419, 5,663,973, 5,761,236, and 5,946,337, and U.S. patent application Ser. Nos. 09/317,695, 09/130,277, 09/244,554, 09/317,527, 09/073,070, 60/124,241, 60/140,532, 60/147,219, 60/173,993, 60/170,342, 60/170,919, 60/182,083, 09/073,070, 60/166,277, 60/166,967, 60/167,835 and 60/140,531, each of which is assigned to the same assignee as the present application, and U.S. Pat. Nos. 5,978,409, 5,999,318, 5,095,492, 5,684,822, 5,835,520, 5,852,627, 5,856,991, 5,898,725, 5,657,334, 5,901,163, 5,917,849, 5,970,082, 5,404,366, 4,975,919, 5,142,543, 5,596,596, 5,802,094, 4,856,018, 4,696,012, 5,646,954, 4,873,692, 4,972,429, 5,596,456, 5,081,635, 4,829,536, 5,748,316, 5,150,370, and 4,829,536, and European patent application No. 0 472 727 A1 and PCT application No. 96/16455, all of which are hereby incorporated by reference. Some of the line selection and/or line narrowing techniques set forth in these patents and patent applications may also be used in combination.

The beam expander shown in FIG. 2 is specifically contemplated for use with the ArF laser, and may also be used with the KrF and $F_2$ lasers. The beam expander may include fewer or more than four prisms. The beam expander may include other beam expanding optics such as one or more lenses, e.g., a diverging lens and a collimating lens, and may include reflective optics (see, e.g., U.S. Pat. No. 6,163,559, which is hereby incorporated by reference). The prisms 30–33 may have anti-reflective coatings on one or more surfaces that the beam impinges upon.

The prisms 30–33 are beam expanding prisms and as such the beam exits each prism 30–33 approximately normal to the back surface of each prism 30–33 as the beam propagates toward the grating 35. The angular alignment of each prism 30–33 is shown relative to the direction of the incoming (and outgoing) beam 36 from (to) the laser tube (not shown). The prisms 30–33 are aligned as shown having their front or entrance surfaces, respectively, at angles $\gamma_1$, $\gamma_2$, $\gamma_3$, and $\gamma_4$ to the direction of the incoming beam 36. Each prism 30–33 and any etalon(s) of the line-narrowing module preferably comprise calcium fluoride, and may comprise fused silica particularly for the KrF laser, or another material having similar DUV or VUV transmissive and thermal properties such as $BaF_2$, $SrF_2$, LiF, $MgF_2$, etc. (see U.S. patent application Nos. 60/162,735 and 09/584,420, assigned to the same assignee and hereby incorporated by reference, and the U.S. Pat. No. 5,761,236 patent, mentioned above).

The grating 35 is preferably a highly reflective diffraction grating 35 (some preferred gratings are described in the '835 and '342 applications, mentioned above). The plane of the grating 35 is shown aligned at angle $\gamma_5$ to the direction of the incoming beam 36.

The grating 35 is shown mounted on a heat sink 38. The grating 35 is preferably fixed immovably on the heat sink 38. The heat sink 38 is also preferably fixed immovably within the front or rear optics module 10, 12. The heat sink 38 is preferably comprised of a material having a high thermal conductivity such that heat is efficiently diffused throughout the heat sink 38. The heat sink may be water-cooled or otherwise thermally controlled. The grating 35 and heat sink 38 are attached in such a way that heat transfer is very efficient. The high thermal conductivity material of the heat sink 38 is preferably a material such as copper, aluminum, brass, alloys thereof, or other materials of similarly high thermal conductivity. The heat sink is preferably attached to the grating 35 by soft pressing the grating directly to the surface of the heat sink 38 or using an intermediate layer such as of In, Pb or a similar material.

Some of the light intensity of the incident beam is absorbed by the grating 35 and transformed into heat. More heating of the grating 35 occurs as the laser is operated at higher repetition rates, as is the trend in lithographic excimer lasers. The heat diffuses through the grating 35 and is advantageously transferred to the heat sink 38, in accord with the preferred embodiment.

Thus, the grating 35 of the present invention heats up less quickly than a conventional grating mounted into a same or similar laser. Also, the grating 35 reaches a maximum temperature below that reached by conventional gratings of laser systems operating at the same repetition rate. The lifetime of the grating 35 is advantageously increased because the grating 35 is less likely to fail due to thermal induced stresses and defects, particularly at its surface. The performance of the grating is also enhanced due to the increased thermal stability of the grating 35-heat sink 38 combination, and thus the line-narrowed output emission beam of the laser has improved wavelength stability.

The grating 35 is also shown within a sealed enclosure 40. The enclosure 40 is preferably configured to withstand positive and negative pressures relative to ambient from a few millibar to several bars. In a particular embodiment, the enclosure 40 is configured to be pressure-controlled between around 1 bar and 4.5 bar.

A port 42 is shown for filling the enclosure with an inert gas such as preferably argon or nitrogen. Other inert gases may be used wherein the inert gases do not absorb around the emission wavelength of the laser being used, e.g., around 193 nm for the ArF laser, around 248 nm for the KrF laser, and around 157 nm for the $F_2$ laser. The enclosure 40 may be within a larger enclosure used to exclude photoabsorbing species and contaminants from the beam path. More than one inlet port may be provided and a separate outlet port may be provided. A port connected to a low pressure source such as a pump may also be provided. A gauge or other mechanism for measuring the pressure in the enclosure is also preferably included and a connection for permitting a signal to be sent to the processor 16 is included for processor monitoring of the pressure.

The pressure in the enclosure 40 is preferably controllably adjustable in the ranges mentioned above. For example, the pressure may be finely raised or lowered, e.g., at a rate of 1 mbar/second. The temperature in the enclosure 40 is preferably also monitored and controlled.

The interior gas pressure within the enclosure 40 may be adjustable by controlling a continuous flow from an inlet port 42 to an outlet port 43. The outlet port 43 may or may not be connected to a pump in which case the pressure may be lower than 1 mbar. The flow may be regulated by a pressure regulator connected before the inlet 42, or a flow control valve, or a conventional means not just mentioned for controlling gas flow and/or pressure. The flowing gas is preferably an inert gas such as helium, nitrogen, or argon. The flow may be continuously controlled such that any pressure within a continuous pressure range may be tuned within the enclosure. This allows the wavelength of the laser beam to be tuned within a continuous range of wavelengths.

The pressure-controlled enclosure 40 allows the index of refraction n of the gas in the enclosure 40 to be adjusted. By adjusting the index of refraction n of the gas in the enclosure 40, the central resonator acceptance angle wavelength, i.e., the central wavelength that is reflected from the line-narrowing module including the grating 35 into the acceptance angle of the resonator, is changed. The grating formula, i.e., $m\lambda=2d \sin \theta$, is unaffected by the pressure in the enclosure 40. As the beam exits the enclosure 40, however, the wavelength $\lambda$ becomes $\lambda'=n(P)\lambda$, assuming n=1 outside of the enclosure 40. Thus, the wavelength of the line-narrowed output emission beam of the laser may be advantageously tuned by controlling the pressure of the gas within the enclosure 40, and the grating 35 can remain fixed in its position attached to the heat sink 38 when the laser is being tuned.

Figure 3:
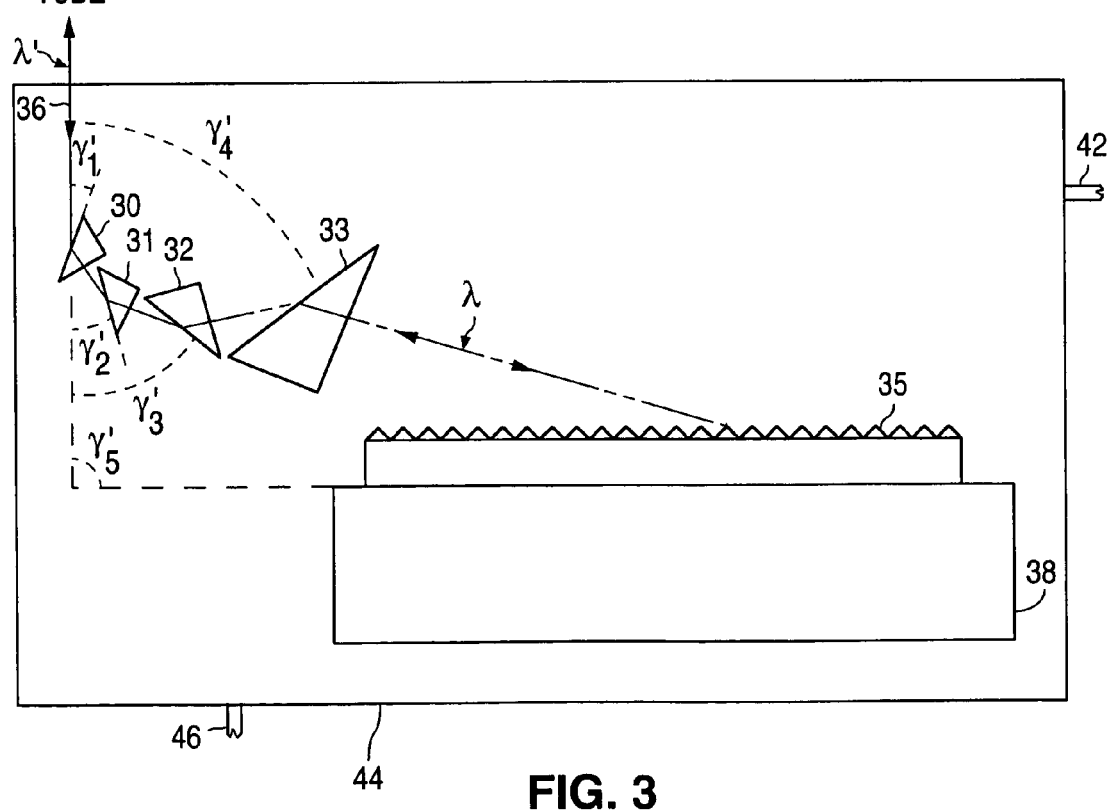
FIG. 3 schematically shows a line-narrowing module in accord with a second embodiment.

FIG. 3 schematically shows a line-narrowing module in accord with a second embodiment. The line-narrowing unit including the prisms 30–33 and the grating 35 attached to the heat sink 38 are the same as those shown and described with regard to FIG. 2. The enclosure 40 of FIG. 2 is replaced in the second embodiment by a different enclosure 44, as shown in FIG. 3. The entire line-narrowing unit including the beam expander is sealed within the enclosure 44, and not just the grating 35.

The enclosure 44 is again preferably configured to withstand positive and negative pressures relative to ambient from a few millibar to several bars, and particularly between around 1 bar and 4.5 bar. A port 46 is shown for filling the enclosure with an inert gas similar to the port 42 of FIG. 2, and more than one inlet port and/or a separate outlet port and/or a pump port may be provided. A gauge or other mechanism for measuring the pressure in the enclosure 44 is also included. The pressure in the enclosure 44 may again be finely raised or lowered, e.g., at a rate of 1 mbar/second, and the temperature in the enclosure 44 is preferably also monitored and controlled.

The interior gas pressure within the enclosure 44 may be adjustable by controlling a continuous flow from an inlet port 46 to an outlet port 47. The outlet port 47 may or may not be connected to a pump. The flow may be regulated by a pressure regulator connected before the inlet 46, or a flow control valve, or a conventional means not just mentioned for controlling gas flow and/or pressure. The flow may be continuously controlled such that any pressure within a continuous pressure range may be tuned within the enclosure. This allows the wavelength of the laser beam to be tuned within a continuous range of wavelengths.

The pressure-controlled enclosure 44 allows the index of refraction n of the gas in the enclosure 44 to be adjusted. By adjusting the index of refraction n of the gas in the enclosure 44, the central resonator acceptance angle wavelength, i.e., the central wavelength that is reflected from the line-narrowing module including the beam expander prisms 30–33 and grating 35 into the acceptance angle of the resonator, is changed, as mentioned above.

As mentioned above, the grating formula, i.e., $m\lambda=2d \sin \theta$, is unaffected by the pressure in the enclosure 40, and the plane of the grating 35 is preferably aligned at the same angle $\gamma_5'=\gamma_5$ as in FIG. 2. One or more of the prisms 30–33 may be aligned differently than in FIG. 2. That is, the angles $\gamma_1'$, $\gamma_2'$, $\gamma_3'$, and $\gamma_4'$ may differ from the angles $\gamma_1$, $\gamma_2$, $\gamma_3$, and $\gamma_4$ to compensate changes in the angles of refraction at the prism surfaces due to the refractive index change of the gas surrounding the prisms 30–33. The refractive changes at the prism surfaces may also be compensated by adjusting to different enclosure pressures corresponding to the desired output emission beam wavelengths.

As the beam exits the enclosure 44, the wavelength $\lambda$ becomes $\lambda'=n(P)\lambda$, assuming n=1 outside of the enclosure 44. Thus, the wavelength of the line-narrowed output emission beam of the laser may again be advantageously tuned by controlling the pressure of the gas within the enclosure 44, and the grating 35 can remain in its position fixed to the heat sink 38 when the laser is being tuned. A different portion of the line narrowing module may be enclosed, as well, while some elements remain outside the enclosure, such as by enclosing only one or two prisms rather than all of them.

Figure 4:
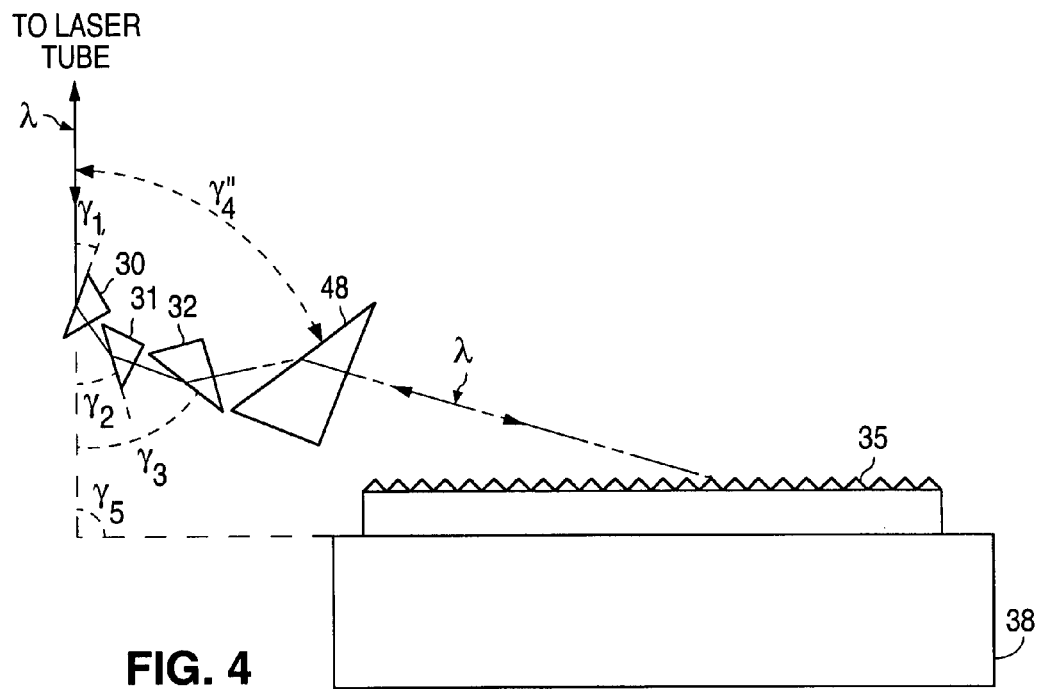
FIG. 4 schematically shows a line-narrowing module in accord with a third embodiment.

FIG. 4 schematically shows a line-narrowing module in accord with a third embodiment. The line-narrowing unit shown includes the prisms 30–32 and the grating 35 attached to the heat sink 38 also shown at FIGS. 2 and 3. There is no enclosure like the enclosures 40 and 44, however, for pressure tuning the wavelength, although the line-narrowing unit, as well as other portions of the beam path, may be enclosed for purging with an inert gas to prevent absorption and/or contamination, etc.

Instead, the prism 48 has been substituted for the prism 33 of FIGS. 2 and 3. The prism 48 preferably has the same or similar dimensions and material composition as the prism 33. However, the prism 48 is rotatable such the angle $\gamma_4''$ is adjustable (see the '554 application, mentioned above). The prism 48 is preferably mounted on a rotatable holder or on a platform or coupling that may be rotated on a fixed holder.

Alternatively, one of the other prisms 30–32 may be rotatable and the prism 48 fixed, or two or more of the prisms 30–32 and 48 may be rotatable. Two or more of the prisms may be synchronously rotatable to compensate refraction angle changes caused by rotation of each prism, as well (see the '554 application).

Advantageously, the central resonator acceptance angle wavelength may be tuned by rotating the prism 48 (and/or other prism or prisms 30–32), and the output emission wavelength of the laser system thereby tuned. The grating 35 may remain fixed in position attached to the heat sink 38.

Figure 5A:
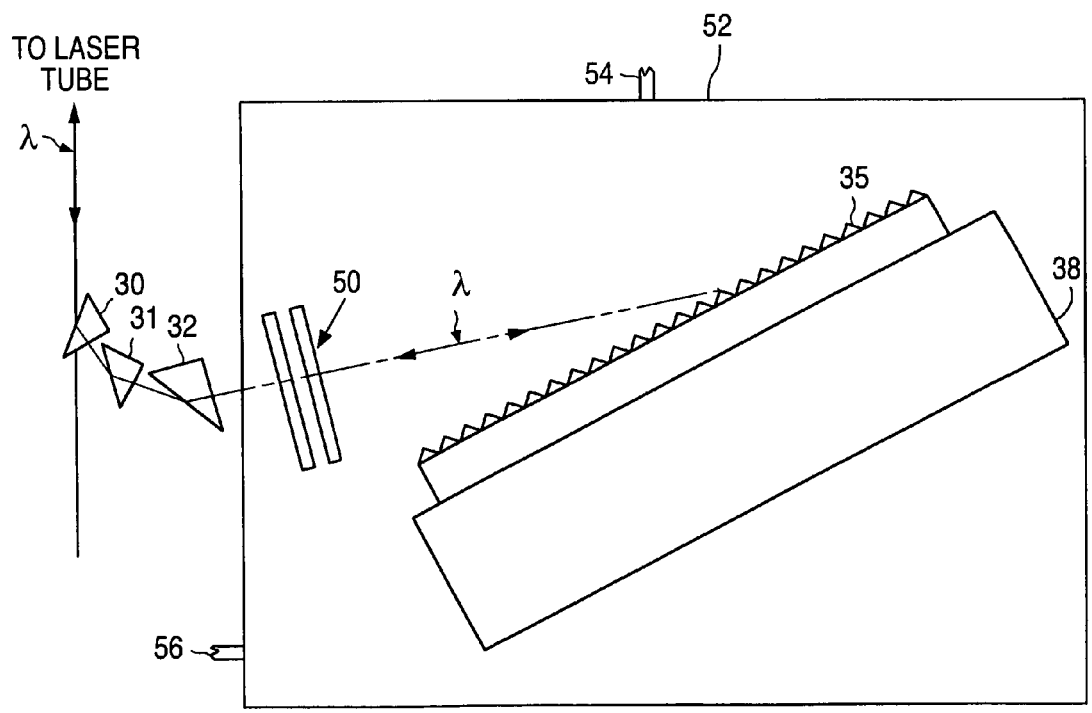
FIG. 5a schematically shows a line-narrowing module in accord with a fourth embodiment.

FIG. 5a schematically shows a line-narrowing module in accord with a fourth embodiment. The line-narrowing module is particularly preferred for use with a KrF laser, but is also contemplated for use with ArF and $F_2$ lasers. The line-narrowing module shown in FIG. 5a has a beam expander including three beam expanding prisms 30–32. There may be more or fewer than three prisms, and the beam expander may use one or more lenses or reflective optics in addition to or in lieu of the prisms 30–32.

An etalon 50 is shown included in the line-narrowing module of FIG. 5a. The etalon 50 is within an enclosure 52 together with the grating 35 which is attached to the heat sink 38. The pressure within the enclosure 52 is varied to tune and/or select the wavelength using over- or under-pressure, and filled with stagnant gas using no purging gas flow or flowing gas using a continuous gas flow. When no flow is used, then preferably only the port 54 is hooked up to a pump or a pressurized gas bottle is connected to it, e.g., through a pressure regulator. When continuous flow is used, then each of ports 54 and 56 is used, one as an inlet 54 and the other as an outlet 56, wherein the outlet may or may not be hooked up to a pump. Preferably, a valve or series of valves is used to control the pressure, and the pump may have variable speeds.

The etalon 50 and the grating 38 are each preferably initially aligned at selected angles to the beam depending on the desired wavelength range to be used, and then the pressure in the enclosure 52 is varied to tune the wavelength around that initially selected wavelength. The etalon 50 may alternatively be outside the enclosure 52.

As is understood by those skilled in the art, an etalon is a specific case of a more general class of interferometric devices, wherein an etalon has a pair of parallel plates. The etalon 50 shown in FIG. 5a is one that has a pair of flat plates, although an etalon may generally have curved plates or may have another geometry wherein a gap spacing between the plates in constant over the cross section of the etalon. Wherever an etalon is mentioned herein, an interferometric device may be substituted and used within the scope of this description of the preferred embodiments.

In addition, although the preferred embodiments describe line-narrowing modules at FIGS. 2–8 preferably included in the rear optics module 10 of FIG. 1, an output coupling interferometer may be included at the front optics module 12. The interferometer used as an outcoupler would be preferably a device having at least one curved inner surface and one flat inner surface, or two curved inner surfaces having opposing curvatures, such as are described at U.S. patent application Ser. No. 09/715,803, which is assigned to the same assignee and is hereby incorporated by reference. The inner surfaces of the interferometer are non-parallel which serves to improve spectral purity by cutting out spectral sidebands. The interferometer may alternatively be an etalon or quasi-etalon. Such an output coupling interferometer may be included in a laser resonator including any of the line-narrowing modules set forth in this description of the preferred embodiments.

Figure 5B:
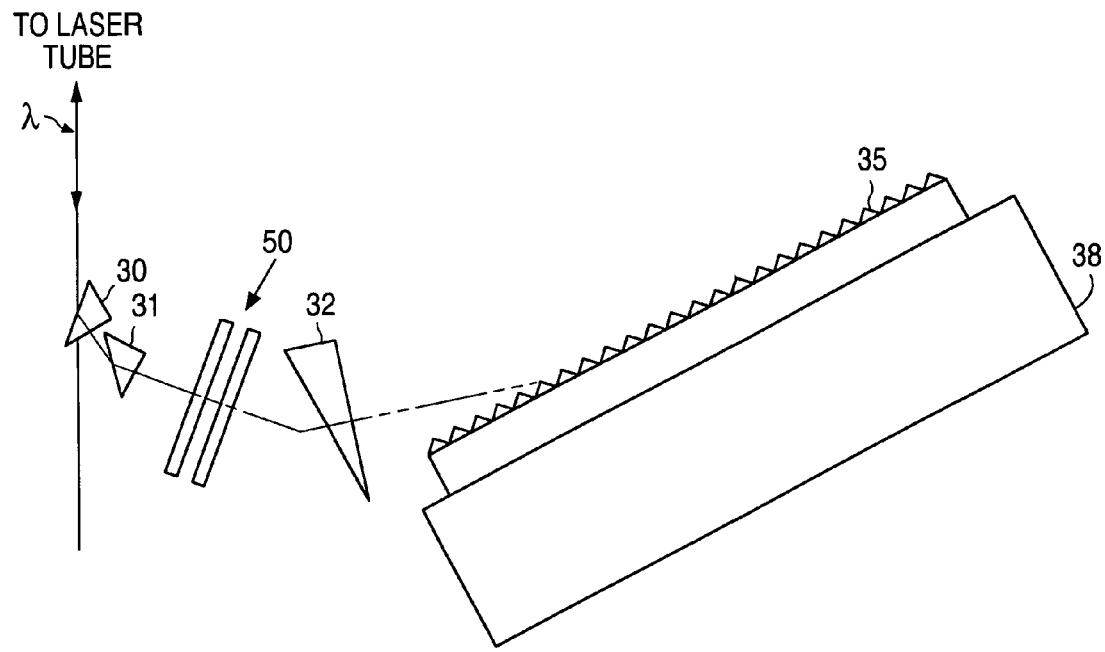
FIG. 5b schematically shows an alternative line-narrowing module.
Figure 5C:
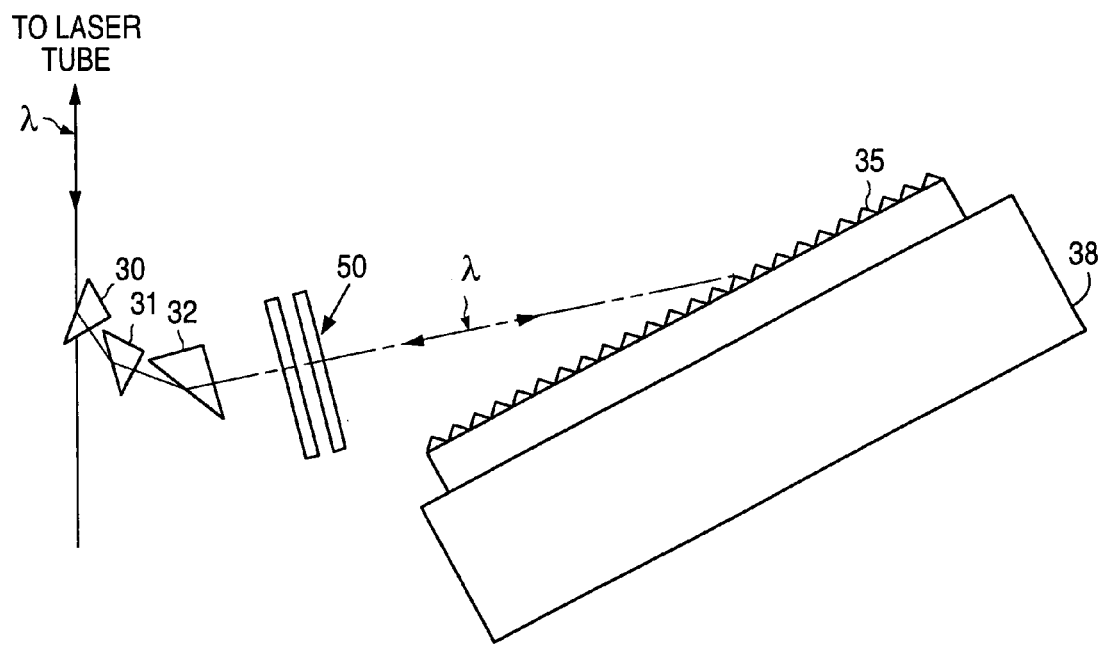
FIG. 5c schematically shows another alternative line-narrowing module.

FIGS. 5b and 5c illustrate another advantageous feature of positioning the etalon after the third beam expanding prism 32, as introduced in FIG. 5a. In these embodiments, wavelength tuning may be performed by any means described herein or as known to those skilled in the art such as by rotating the grating or another element such as a prism or etalon, or by pressure tuning the grating, the etalon, the whole line-narrowing unit, etc. The grating 35 may be connected to the heat sink 38 as is preferred or may be conventionally disposed within the line-narrowing module of the excimer or molecular fluorine laser (see, e.g., U.S. Pat. No. 6,094,448, hereby incorporated by reference).

In the embodiment shown in FIG. 5b, the first two beam expanding prisms 30 and 31 encounter the beam as it emerges from the laser tube (not shown). Next, the beam traverses the etalon 50 and finally the third beam expanding prism 32 prior to impinging upon the grating 35. This line-narrowing portion of the resonator may be part of a polarization coupled resonator as is known in the art (see, e.g., U.S. Pat. Nos. 5,150,370 and 5,559,816, hereby incorporated by reference).

As repetition rates are increased to more than 2 kHz, as is desired in the art, discharge widths are desired to be reduced, such as by reducing electrode widths (see the Ser. No. 09/453,670 application, incorporated by reference above), in order to meet increased clearing ratio requirements (rep rate<clearing ratio≈volumetric gas flow speed through the discharge/discharge width). In addition, heating of optical elements, and particularly the etalon, will be more pronounced at the greater repetition rates due to an incident power increase where the pulse energy remains the same as it was at the lower rep rates. Moreover, at reduced discharge width, the beam will occupy a smaller geometrical extent, resulting in more localized heating of optics and corresponding distortions.

The embodiment of FIG. 5c is thus particularly preferred for lasers operating at high repetition rates (e.g., 2–4 kHz or more), and correspondingly with reduced discharge widths as described above. The third beam expanding prism 32 is disposed before the etalon 50 in the embodiment of FIG. 5c, wherein the positions of this prism 32 and the etalon 50 are switched from that shown and described with respect to FIG. 5b. By having the third prism 32 before the etalon 50, the beam divergence is reduced and beam expansion is increased before the beam is incident on the etalon 50. The reduced divergence advantageously provides improved performance of the etalon as a smaller range of incidence angle of rays of the incident beam are subjected to the angularly dependent interference properties of the etalon.

As mentioned above, the discharge width is preferably reduced at higher rep rates to improve the clearing ratio. In the arrangement of FIG. 5b, at the larger discharge width of conventional laser systems operating at lower repetition rates, the beam has a larger geometry and preferably occupies a substantial extent of the plates of the etalon 50. However, when the discharge width is reduced, the beam geometry is correspondingly reduced, and thus occupies a small extent of the plates of the etalon 50. Thus, if the arrangement of FIG. 5b continues to be used, then the beam will occupy a smaller area of the plates of the etalon 50, since the divergence and amount of beam expansion are the same and the beam began with a smaller width due to the reduced discharge width, resulting in increased localized heating.

It is desired to utilize the substantial extent of the plates of the etalon 50. The increased beam expansion prior to the etalon 50 provided in the embodiment of FIG. 5c allows for reduced localized heating of the etalon 50, compared with that of FIG. 5b for a same repetition rate and discharge width. A fourth prism (not shown) may be disposed after the etalon 50 or before the etalon 50.

The inclusion of the grating 35, interferometric device 50 which may be disposed in the line-narrowing module or in the front optics module 12, e.g., as an output coupling device, and prisms 30–32 of the beam expander permit operation at bandwidths below 5 pm. The prisms 30–32 and the interferometeric device 50 which is preferably an etalon when used in the line-narrowing module of the rear optics 10, e.g., in a KrF laser or $F_2$ laser, and is preferably as set forth at U.S. patent application Ser. No. 09/715,803, hereby incorporated by reference, when used as an outcoupler, e.g., in an ArF or $F_2$ laser, each incur absorption which occurs at a higher rate when the laser is operated at these higher repetition rates above 2 kHz. The prisms 30–32 of the beam expander and plates of the interferometric device are advantageously formed of a thermally stable material (such as has low absorption, high thermal conductivity, etc.) at DUV wavelengths and below, and specifically at 248 nm for the KrF laser, 193 nm for the ArF laser and 157 nm for the $F_2$ laser. Such materials are preferably $CaF_2$, $MgF_2$, $BaF_2$ or LiF. $CaF_2$ is mostly preferred and $MgF_2$ is alternatively preferred to $CaF_2$.

Figure 6:
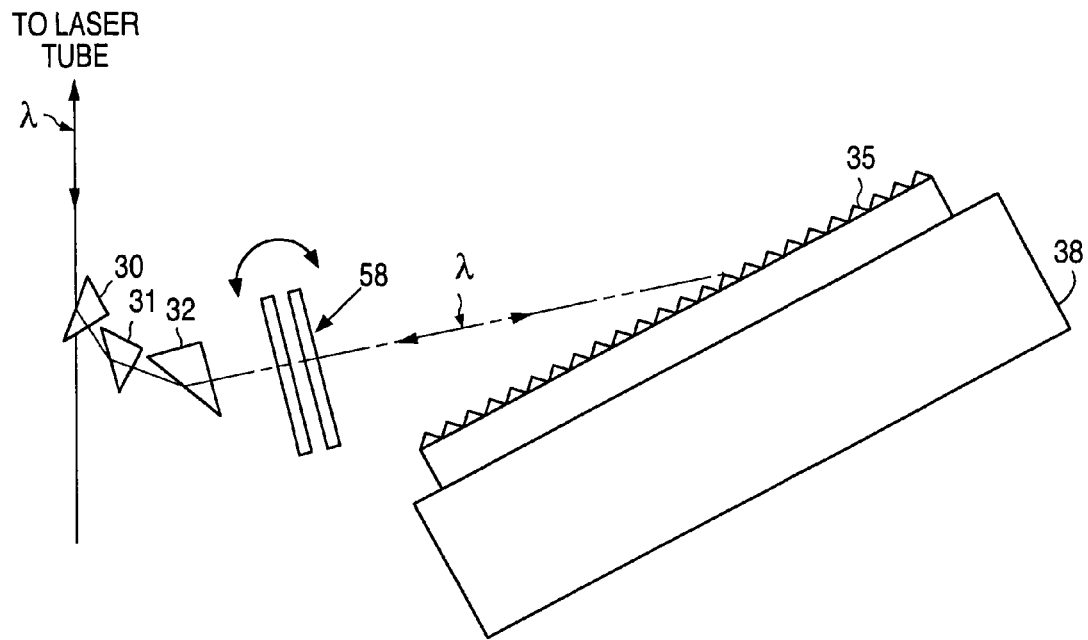
FIG. 6 schematically shows a line-narrowing module in accord with a fifth embodiment.

FIG. 6 schematically shows a line-narrowing module in accord with a fifth embodiment. The line-narrowing module of FIG. 6 is the same as the fourth embodiment shown in FIG. 5a, except there is no enclosure 52 and the etalon 50 is replaced by the etalon 58. The etalon 58 differs from the etalon 50 in that the etalon 58 is preferably rotatable for tuning the wavelength output by the line-narrowing module. The etalon 50 of FIG. 5a could also be alternatively rotatable, but preferably the etalon 50 is fixed at the initially selected angle, as discussed above.

Since there is no enclosure 52 for tuning the wavelength in the fifth embodiment, although the line-narrowing module may be otherwise enclosed to prevent photoabsorbing species from contaminating the beam path, and once again the grating 35 is fixed to the heat sink 38, then the rotatable property of the etalon 58 is advantageous for tuning the wavelength and/or stabilizing the wavelength, e.g., in a feedback loop with a processor 16 and wavelength detector of the diagnostic module 18. It is noted here that a feedback arrangement with the processor 16 is preferred in all of the first through seventh embodiments notwithstanding the manner is which the wavelength is tuned and/or stabilized. Alternatively with respect to the fifth embodiment, one or more of the prisms 30–32 may be rotatable for tuning the wavelength, while the etalon 58 is either rotatable as well, or fixed.

Figure 7:
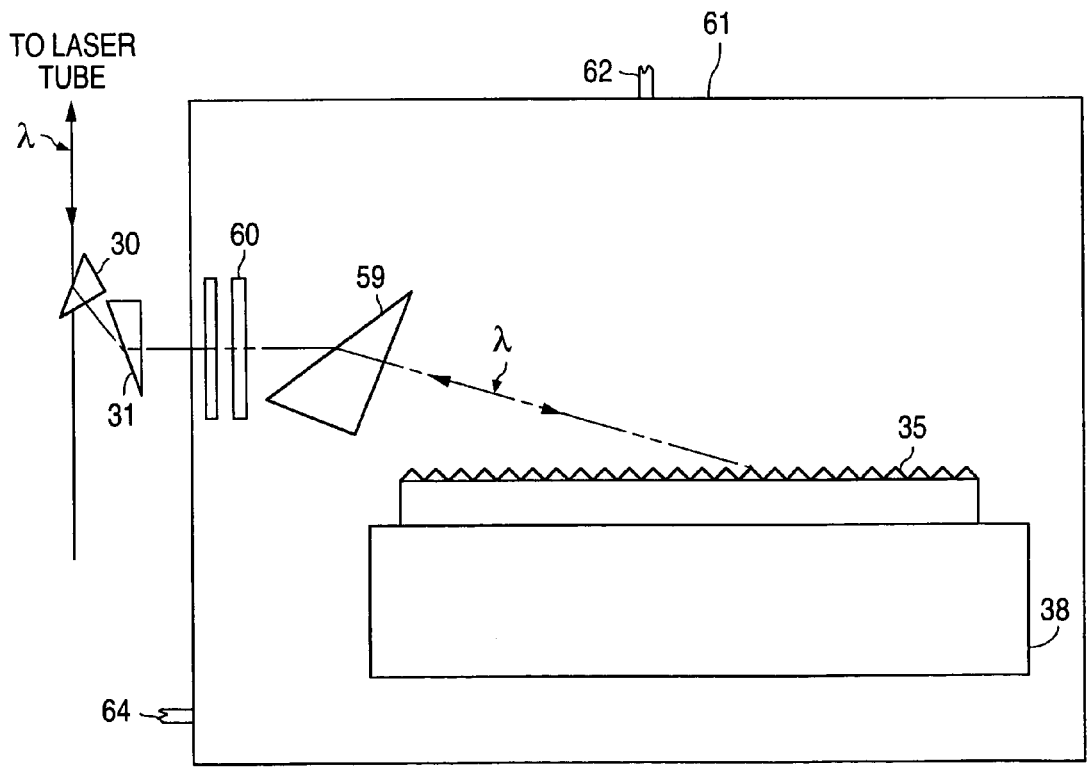
FIG. 7 schematically shows a line-narrowing module in accord with a sixth embodiment.

FIG. 7 schematically shows a line-narrowing module in accord with a sixth embodiment. The line-narrowing module is particularly preferred for use with a KrF laser, but is also contemplated for use with ArF and $F_2$ lasers. The line-narrowing module shown in FIG. 7 has a beam expander including three beam expanding prisms 30–31 and 59. There may be more or fewer than three prisms, and the beam expander may use one or more lenses or mirrors in addition to or in lieu of only the prisms 30–31 or each of prisms 30–31 and 59.

An etalon 60 is included in the line-narrowing module of FIG. 7. The etalon 60 is within an enclosure 61 together with the prism 59 and the grating 35 which is attached to the heat sink 38. The positions of the etalon 60 and prism 59 may be switched, and preferably are, for higher repetition rate laser operation as explained above with reference to FIGS. 5a and 5b.

The pressure within the enclosure 61 is varied to tune and/or select the wavelength using over- or under-pressure, and either filled with stagnant gas using no purging gas flow, or using a flowing gas and a continuous gas flow. When no flow is used, then preferably only the port 62 is hooked up to a pump or a pressurized gas bottle, e.g., through a pressure regulator. When continuous flow is used, then each of ports 62 and 64 is used, one as an inlet 62 and the other as an outlet 64, wherein the outlet 64 may or may not be connected to a pump. Preferably, a valve or series of valves is used to control the pressure, and the pump, if used, may have variable speeds.

The etalon 60 and the grating 35 are each preferably initially aligned at selected angles to the beam depending on the desired wavelength range to be used, and then the pressure in the enclosure 61 is varied to tune the wavelength around that initially selected wavelength. The etalon 60 or both the etalon 60 and the prism 59 may alternatively be outside the enclosure 52.

Figure 8:
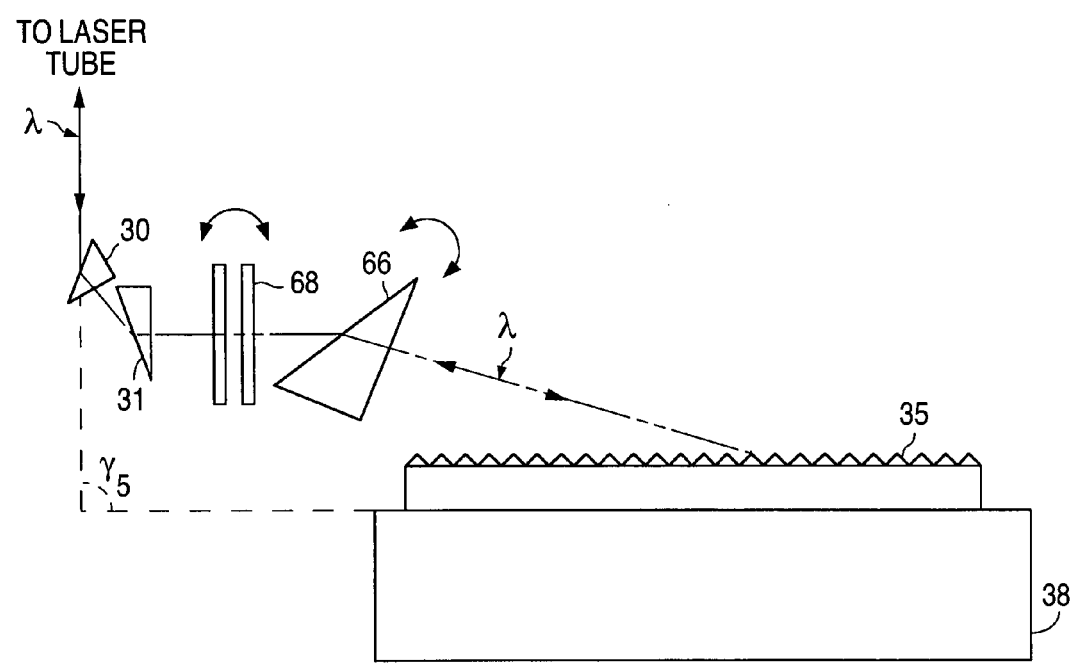
FIG. 8 schematically shows a line-narrowing module in accord with a seventh embodiment.

FIG. 8 schematically shows a line-narrowing module in accord with a seventh embodiment. The line-narrowing module of FIG. 8 is preferably the same as the sixth embodiment described with reference to FIG. 7, except there is no enclosure 61 and the etalon 60 is replaced by the etalon 68 and/or the prism 59 is replaced with the prism 66. The etalon 68 differs from the etalon 60 in that the etalon 68 is preferably rotatable for tuning the wavelength output by the line-narrowing module. Alternatively, the prism 66 may differ from the prism 59 in that the prism 66 may be rotatable or tuning the wavelength. The etalon 60 and/or prism 59 of the sixth embodiment of FIG. 7 could also be alternatively rotatable, but preferably the etalon 60 and prism 59 are fixed at the initially selected angles, as discussed above. The other prisms 30, 31 may be additionally or alternatively rotatable, and may be synchronously rotatable as set forth at the Ser. No. 09/244,554 application, incorporated by reference above.

Since there is no enclosure 61 for tuning the wavelength in the seventh embodiment, and once again the grating 35 is fixed to the heat sink 38, then the rotatable property of the etalon 68 or prism 66 is advantageous for tuning the wavelength and/or stabilizing the wavelength, e.g., in a feedback loop with a processor and wavelength detector of the diagnostic module 18.

The above objects of the invention have been met. Several embodiments of a line-narrowing module for a precision-tunable excimer laser have been described (as well as many further variations discussed above). The bulky grating 35 may remain fixed in position while the wavelength is precisely tuned by finely adjusting the pressure in the enclosures 40, 44, or by rotating one or more of the prisms 30–32, 48 and/or an etalon 58, 68.

A line-narrowing module particularly for a high repetition rate excimer laser having a thermally stabilized diffraction grating has also been described. By attaching the grating 35 to the heat sink, the heat that may otherwise degrade the performance and/or structure of the grating 35 is advantageously dissipated in the heat sink 38.

Those skilled in the art will appreciate that the just-disclosed preferred embodiments are subject to numerous adaptations and modifications without departing from the scope and spirit of the invention. Therefore, it is to be understood that, within the scope and spirit of the invention, the invention may be practiced other than as specifically described above. In particular, the invention is to be interpreted in accordance with the appended claims, and equivalents thereof, without limitations being read from the specification above.

For example, the advantages of pressure-tuning using the enclosures 40, 44 or tuning the wavelength by rotating one or more of the prisms 30–33, 48 may be realized without attaching the grating 35 to the heat sink 38. Moreover, the enclosure may seal different elements of the line-narrowing module. For example, the enclosure may seal one or more of the prisms 30–33, 48 and/or an etalon without sealing the grating 35. Also, the advantages of attaching the grating 35 to the heat sink 38 may be realized while still rotating the grating 35 along with the heat sink 38 to tune the wavelength. In addition, the enclosure 40, 44 may be advantageously prepared such as is described at U.S. patent application Ser. No. 09/343,333 free of VUV absorbing species, particularly for an $F_2$ laser, or even an ArF laser.

What is claimed is:

1. An excimer or molecular fluorine laser, comprising:
   a discharge chamber filled with a gas mixture including molecular fluorine;
   a plurality of electrodes within the discharge chamber connected to a pulsed discharge circuit for energizing the gas mixture;
   two resonator reflector surfaces disposed on opposite sides of the discharge chamber; and
   a line-narrowing module adjacent to one of the resonator reflector surfaces, wherein the discharge chamber, resonator reflector surfaces, and line-narrowing module form a resonator for generating a laser beam;
   wherein the line-narrowing module includes:
      a beam expander disposed in a path of the laser beam and having one or more optical elements for expanding the beam and reducing a divergence of the beam;
      a reflection grating disposed in the path of the laser beam;
      a heat sink in thermal contact with the reflection grating; and
      means for tuning a wavelength of the laser beam output by the line-narrowing module.

2. The laser of claim 1, further comprising one or more interferometric devices disposed in the path of the laser beam for further improving a spectral purity of the beam.

3. The laser of claim 2, wherein at least one of the one or more interferometric devices is rotatable for tuning the wavelength output by the line-narrowing module.

4. The laser of claim 1, wherein the beam expander includes one or more prisms.

5. The laser of claim 4, wherein at least one of the one or more prisms is rotatable for tuning the wavelength output by the line-narrowing module.

6. The laser of claim 4, wherein at least two of the prisms are synchronously rotatable for tuning the wavelength output by the line narrowing module, and for mutually compensating a re-directing of the beam path produced by rotation of said prisms.

7. The laser of claim 1, further comprising a sealed enclosure around one or more optical elements of the line-narrowing module and a processor including means for monitoring the wavelength of the beam, wherein the sealed enclosure is separate from any other enclosure used to exclude photoabsorbing species and contaminants from the beam path, and wherein the sealed enclosure includes an inert gas inlet for filling the enclosure with an inert gas, the processor further including means for controlling the pressure of the inert gas within the sealed enclosure for tuning the wavelength output by the line-narrowing module.

8. The laser of claim 7, wherein the sealed enclosure further includes an outlet for flowing an inert gas through said sealed enclosure.

9. The laser of any of claim 7 or 8, wherein the grating is within the sealed enclosure.

10. The laser of claim 9, wherein the beam expander includes one or more elements disposed within the sealed enclosure.

11. The laser of claim 9, wherein the line-narrowing module further includes one or more interferometric devices.

12. The laser of claim 11, wherein at least one of the one or more interferometric devices is within the sealed enclosure.

13. The laser of any of claim 7 or 8, wherein the line-narrowing module further includes one or more interferometric devices within the sealed enclosure.

14. The laser of any of claim 7 or 8, wherein the line-narrowing module further includes one or more elements of the beam expander within the sealed enclosure.

15. An excimer or molecular fluorine laser, comprising:
   a discharge chamber filled with a gas mixture including molecular fluorine;
   a plurality of electrodes within the discharge chamber connected to a pulsed discharge circuit for energizing the gas mixture;
   two resonator reflector surfaces disposed on opposite sides of the discharge chamber;
   a line-narrowing module adjacent to one of the resonator reflector surfaces, wherein the line-narrowing module includes one or more optical elements, and wherein the discharge chamber, resonator reflector surfaces, and line-narrowing module form a resonator for generating a laser beam, wherein the line-narrowing module includes a beam expander and a reflection grating disposed in a path of the laser beam;
   a sealed enclosure around the reflection grating of the line-narrowing module and including an inert gas inlet and means for filling the sealed enclosure with an inert gas, wherein the sealed enclosure is separate from any other enclosure used to exclude photoabsorbing species and contaminants from the beam path, and wherein the sealed enclosure further includes an outlet for flowing the inert gas through said sealed enclosure; and
   a processor including means for monitoring the wavelength of the beam, the processor further including means for controlling the pressure of the inert gas within the sealed enclosure for tuning the wavelength output by the line-narrowing module.

16. The laser of claim 15, wherein at least one optical element of the beam expander is also within the sealed enclosure.

17. The laser of claim 15, wherein the line-narrowing module further includes one or more interferometric devices within the sealed enclosure.

18. The laser of claim 15, wherein the processor controls the pressure within the sealed enclosure by controlling a rate of flow of said inert gas.

19. The laser of any of claim 1 or 15, further comprising an output coupling interferometer disposed in the path of the laser beam and including at least one curved inner surface such that a gap spacing between said curved surface and an opposing inner surface varies over a cross section of the interferometer.

20. The laser of claim 19, wherein said opposing inner surface is a substantially flat surface.

21. The laser of claim 19, wherein said opposing inner surface is curved surface, wherein said two inner surfaces having opposing curvatures.

22. The laser of claim 19, wherein said laser is an ArF laser emitting at a wavelength of 193 nm.

23. The laser of any of claim 1, or 15, further comprising an etalon output coupler disposed in the path of the laser beam.

24. The laser of any of claim 1 or 15, wherein the laser is a molecular fluorine laser emitting around 157 nm.

25. The laser of any of claim 1 or 15, wherein the laser is an ArF laser emitting around 193 nm.

26. The laser of any of claim 1 or 15, wherein the laser is a KrF laser emitting around 248 nm.

27. The laser of claim 1, wherein the line-narrowing module further includes an interferometric device disposed between the grating and the beam expander.

28. The laser of claim 15, wherein the line-narrowing module further includes an interferometric device disposed between the grating and the beam expander.

29. An excimer or molecular fluorine laser, comprising:
a discharge chamber filled with a gas mixture including molecular fluorine and a buffer gas;
a plurality of electrodes within the discharge chamber connected to a pulsed discharge circuit for energizing the gas mixture at a repetition rate of more than 2 kHz; and
two resonator reflector surfaces disposed on opposite sides of the discharge chamber;
a line-narrowing module adjacent to one of the resonator reflector surfaces, wherein the discharge chamber, resonator reflector surfaces, and line-narrowing module form a resonator for generating a laser
wherein the a line-narrowing module includes a beam expander, an interferometric device and a grating each disposed in a path of the laser beam for reducing the bandwidth of the beam to less than 0.5 pm,
wherein the beam expander comprises optics composed of a material that is thermally stable at DUV wavelengths and below and at said repetition rate of more than 2 kHz, wherein said interferometric device comprises a pair of plates composed of said same thermally stable material, and wherein the grating is thermally and mechanically stabilized within the line-narrowing module.

30. The laser of claim 29, wherein said thermally stable material of said optics of said beam expander and of said plates of said interferometric device is selected from the group of materials consisting of $CaF_2$, $MgF_2$, LiF and $BaF_2$.

31. The laser of claim 29, wherein said thermally stable material of said optics of said beam expander and of said plates of said interferometric device is $CaF_2$.

32. The laser of claim 29, wherein said thermally stable material of said optics of said beam expander and of said plates of said interferometric device is $MgF_2$.

33. An excimer or molecular fluorine laser, comprising:
a discharge chamber filled with a gas mixture including molecular fluorine;
a plurality of electrodes within the discharge chamber connected to a pulsed discharge circuit for energizing the gas mixture;
two resonator reflector surfaces disposed on opposite sides of the discharge chamber; and
a line-narrowing module adjacent to one of the resonator reflector surfaces, wherein the discharge chamber, resonator reflector surfaces, and line-narrowing module form a resonator for generating a laser;
wherein the line-narrowing module includes a beam expander, an interferometric device and a grating, each disposed in the path of the laser beam, and wherein the line-narrowing module reduces the bandwidth of the beam,
wherein the interferometric device is disposed between the grating and the beam expander.

34. The laser of claim 33, wherein the beam expander includes a plurality of prisms each disposed between the interferometric device and the discharge chamber.

35. The laser of claim 33, wherein the beam expander includes at least three prisms each disposed between the interferometric device and the discharge chamber.

36. The laser of any of claims 33–35, wherein the laser is a KrF laser emitting around 248 nm.

37. An excimer or molecular fluorine laser, comprising:
a discharge chamber filled with a gas mixture including molecular fluorine;
a plurality of electrodes within the discharge chamber connected to a pulsed discharge circuit for energizing the gas mixture;
two resonator reflector surfaces disposed on opposite sides of the discharge chamber;
a line-narrowing module adjacent to one of the resonator reflector surfaces and including one or more optical elements, wherein the discharge chamber, resonator reflector surfaces, and line-narrowing module form a resonator for generating a laser;
a sealed enclosure around the one or more optical elements of the line-narrowing module, wherein the sealed enclosure includes an inert gas inlet for filling the sealed enclosure with an inert gas, and wherein the sealed enclosure is separate from any other enclosure used to exclude photoabsorbing species and contaminants from the beam path; and
a processor including means for monitoring the wavelength of the beam, the processor further including means for controlling the pressure of the inert gas within the sealed enclosure for tuning the wavelength output by the line-narrowing module,
wherein the line-narrowing module includes:
a beam expander disposed in a path of the laser beam and including one or more optical elements for expanding the beam and reducing a divergence of the beam;
a reflection grating disposed in the path of the laser beam; and
a heat sink in thermal contact with the reflection grating.

38. The laser of claim 37, wherein the sealed enclosure further includes an outlet for flowing an inert gas through said sealed enclosure.

39. The laser of any of claim 1 or 37, wherein said grating is fixably attached to said heat sink.

* * * * *